United States Patent
Kudva et al.

(10) Patent No.: US 11,750,192 B2
(45) Date of Patent: Sep. 5, 2023

(54) STABILITY OF BIT GENERATING CELLS THROUGH AGING

(71) Applicant: NVIDIA Corp., Santa Clara, CA (US)

(72) Inventors: Sudhir Shrikantha Kudva, Dublin, CA (US); Nikola Nedovic, San Jose, CA (US); Yan He, Houston, TX (US)

(73) Assignee: NVIDIA CORP., Santa Clara, CA (US)

( * ) Notice: Subject to any disclaimer, the term of this patent is extended or adjusted under 35 U.S.C. 154(b) by 42 days.

(21) Appl. No.: 17/546,438

(22) Filed: Dec. 9, 2021

(65) Prior Publication Data

US 2022/0271752 A1 Aug. 25, 2022

Related U.S. Application Data

(63) Continuation-in-part of application No. 17/481,154, filed on Sep. 21, 2021, which is a continuation-in-part of application No. 17/184,396, filed on Feb. 24, 2021, now Pat. No. 11,411,563.

(51) Int. Cl.
*H03K 19/003* (2006.01)
*H03K 19/0185* (2006.01)

(52) U.S. Cl.
CPC .......... *H03K 19/00315* (2013.01); *H03K 19/018521* (2013.01)

(58) Field of Classification Search
CPC .......... H03K 19/173; H03K 19/17708; H03K 19/17748; H03K 19/17756; H03K 19/17768; H04L 9/0861; H04L 9/32; H04L 9/3278
See application file for complete search history.

(56) References Cited

U.S. PATENT DOCUMENTS

| | | | |
|---|---|---|---|
| 6,118,869 A | 9/2000 | Kelem et al. | |
| 6,873,551 B2 | 3/2005 | Bedarida et al. | |
| 7,492,630 B2 | 2/2009 | Scheuerlein et al. | |
| 7,495,947 B2 | 2/2009 | Scheuerlein et al. | |
| 7,522,448 B2 | 4/2009 | Scheuerlein et al. | |
| 7,719,874 B2 | 5/2010 | Scheuerlein et al. | |
| 8,981,810 B1 * | 3/2015 | Trimberger | H03K 19/003 326/8 |

(Continued)

FOREIGN PATENT DOCUMENTS

| CN | 110020557 A | 7/2019 |
|---|---|---|
| CN | 108734030 B | 7/2020 |

(Continued)

OTHER PUBLICATIONS

20-SC-0535TW01 Official Communication Taiwan Intellectual Property Office First Office Action dated Apr. 7, 2022.

(Continued)

*Primary Examiner* — Jason Crawford
(74) *Attorney, Agent, or Firm* — Rowan TELS LLC

(57) ABSTRACT

Bit generating cells are subjected to processes that accelerate aging-related characteristics before they are configured for use in the field (enrolled). Aging improves the reliability of the cells by shifting device characteristic in a direction that improves the cell behavior with respect not only to aging but also environment variations. Outputs of the cells are read, and the cells are reconfigured with a bias to output an opposite value, and then aged for enrollment.

21 Claims, 23 Drawing Sheets

(56) References Cited

U.S. PATENT DOCUMENTS

| | | | |
|---|---|---|---|
| 9,213,835 | B2 | 12/2015 | Lesea et al. |
| 9,276,583 | B1* | 3/2016 | Satpathy ........... H03K 19/17768 |
| 9,279,856 | B2 | 3/2016 | Laackmann et al. |
| 9,355,743 | B2 | 5/2016 | Ghosh et al. |
| 9,369,277 | B2 | 6/2016 | Augustine et al. |
| 9,698,611 | B2 | 7/2017 | Li et al. |
| 9,947,391 | B1 | 4/2018 | Mahatme et al. |
| 10,224,931 | B1* | 3/2019 | Wang ................ H04L 9/0866 |
| 10,439,613 | B2* | 10/2019 | Karpinskyy ......... H04L 9/0866 |
| 10,439,829 | B1 | 10/2019 | Lin et al. |
| 10,553,886 | B2 | 2/2020 | Buelte et al. |
| 10,574,469 | B1 | 2/2020 | Garni et al. |
| 10,644,712 | B2 | 5/2020 | Cai et al. |
| 10,714,199 | B1* | 7/2020 | Bill ................... H04L 9/3278 |
| 10,764,069 | B1* | 9/2020 | Hurwitz ............. H04L 9/0866 |
| 11,171,793 | B2* | 11/2021 | Schat ................ H04L 9/3278 |
| 11,411,563 | B1* | 8/2022 | Kudva ............... H04L 9/0819 |
| 2002/0170146 | A1 | 11/2002 | Thompson |
| 2015/0192637 | A1* | 7/2015 | Falk ................ G01R 31/2855 326/16 |
| 2016/0285639 | A1* | 9/2016 | Mathew .............. G06Q 10/08 |
| 2016/0329897 | A1* | 11/2016 | Gu ................ H03K 19/017509 |
| 2017/0047917 | A1 | 2/2017 | Heo et al. |
| 2017/0272258 | A1* | 9/2017 | Tanamoto ........... G11C 11/1675 |
| 2018/0218177 | A1* | 8/2018 | Kuenemund ......... H04L 9/0861 |
| 2019/0068190 | A1* | 2/2019 | Karpinskyy ......... H01L 23/576 |
| 2019/0165956 | A1* | 5/2019 | Adham ............. H04L 9/0838 |
| 2020/0044872 | A1* | 2/2020 | Willsch ............. H04L 9/3278 |
| 2021/0135886 | A1* | 5/2021 | Lee ................ H04L 9/0866 |
| 2021/0328818 | A1* | 10/2021 | Sonntag ............... G11C 7/24 |
| 2021/0336804 | A1* | 10/2021 | Parhi ................ G06F 21/73 |
| 2022/0052691 | A1* | 2/2022 | Borrel .............. H03K 19/00384 |
| 2022/0271752 | A1* | 8/2022 | Kudva .............. H03K 19/00315 |
| 2022/0271951 | A1* | 8/2022 | Kudva .............. H03K 19/17768 |
| 2022/0271952 | A1* | 8/2022 | Kudva .............. H03K 19/17748 |

FOREIGN PATENT DOCUMENTS

| | | |
|---|---|---|
| CN | 111723408 A | 9/2020 |
| EP | 3640945 B1 | 3/2021 |

OTHER PUBLICATIONS

NPL_Matthew et al _ "PVT-Variation-Tolerant Hybrid Physically Unclonable Function Circuit for 100% Stable Secure Key Generation in 22nm CMOS" _ Feb. 11, 2014 _ pp. 278-280.

108-0436-TW_Jul. 14, 2022_Second Office Action.

NPL_Alam et al_ Challenges and Opportunities in Analog and Mixed Signal(AMS) Integrated Circuit (IC) Security_Nov. 27, 2017_ pp. 16-32_Department of Electrical and Computer Engineering, University of Florida, Gainesville, FL 32603, USA.

U.S. Appl. No. 17/481,154, filed Sep. 21, 2021, Kudva.

Calin et al, Upset Hardened Memory Design for Submicron CMOS Technology, IEEE Transactions on Nuclear Science, Dec. 1996, pp. 2874-2878, vol. 43, No. 6, Grenoble, France.

He et al, An Automatic Self-Checking and Healing Physically Unclonable Function (PUF), ISSCC 2021, Rice University, Houston, TX.

Shifman et al, A Method to Improve Reliability in a 65-nm SRAM PUF Array, IEEE Solid-State Circuits Letters, Jun. 2018, pp. 138-141, vol. 1, No. 6.

Su et al, A Digital 1.6 pJ/bit Chip Identification Circuit Using Process Variations, IEEE Journal of Solid-State Circuits, Jan. 2008, pp. 69-77, vol. 43, No. 1.

Yang et al., A Physically Unclonable Function with BER <10^8 for Robust Chip Authentication Using Oscillator Collapse in 40nm CMOS, ISSCC 2015, University of Michigan, Ann Arbor, MI.

\* cited by examiner

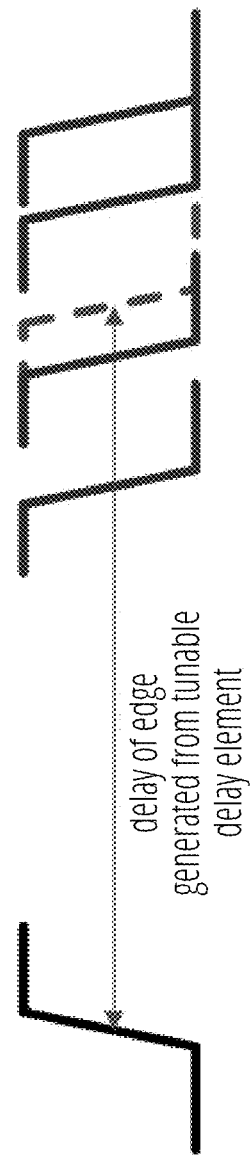
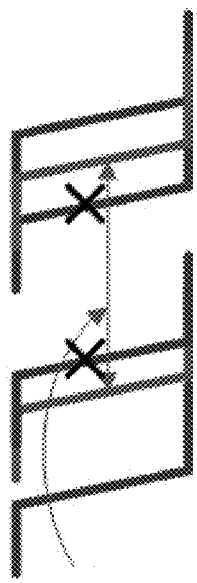
FIG. 10A
FIG. 10B

STABILITY OF BIT GENERATING CELLS THROUGH AGING

CROSS-REFERENCE TO RELATED APPLICATIONS

This application claims priority and benefit as a continuation-in-part of U.S. application Ser. No. 17/184,396, "Detection and mitigation of unstable cells in unclonable cell array", filed on Feb. 24, 2021, the contents of which are incorporated herein by reference in their entirety. This application also claims priority and benefit as a continuation-in-part of U.S. application Ser. No. 17/481,154 "Detection and mitigation of unstable cells in unclonable cell array", filed on Sep. 21, 2021, the contents of which are also incorporated herein by reference in their entirety.

BACKGROUND

An exemplary bit generating cell 100 is depicted in FIG. 1. Differences in source and sink current in the input stage 102 and in the output stage 104 occur due to process variations in strength of different transistor devices. The '0' or '1' value of the output bit thus varies among different instantiations of the circuit. The input stage 102 generates bias voltages in the PFET unit 106 and the NFET unit 108 which are stacked on one another. The voltage at the center node of the stack varies around $V_{dd}/2$ (half the supply voltage) depending on the strengths of the devices in the stack. This voltage is used to bias devices in the NFET unit 108. If the source and sink currents are different due to process variations between the devices in the input stage 102 and output stage 104, then a voltage other than $V_{dd}/2$ results at the output node which is further amplified by the inverter chain.

FIG. 2 depicts another example of a bit generating cell 200. The RESET signal transitions from 0 to 1 to inject falling edges at the output of the NAND gates 202. These two edges chase each other around the loops 204, 206 and continue circulating if all the delays are identical. However, due to process variation in the NAND gates 202 and the delay elements 208, 210, the delays vary and one of the edges traverses the loops faster catches up to the second edge. The output of the bit generating cell 200 settles to either VoutA='1' and VoutB='0' or vice versa.

One type of circuit that utilizes bit generating cells is an unclonable cell array. Physically unclonable bit generating cells are utilized in such circuits for example used to generate keys for security purposes in data processing systems and devices. Unclonable bit generating cells comprise the same circuit elements and layout, but generate different values (e.g., "1" or "0") depending on manufacturing process variations.

Chips under sustained usage shows effects of aging attributed to hot carrier injection (HCI) and bias temperature instability (BTI) in NMOS and PMOS devices. Physically unclonable function (PUF) cell arrays, which utilize NMOS and PMOS devices, are used to generate random, secure keys and codes in digital machines. However, due to aging of the cells, the output of a particular PUF array may change over time and may not match expected key or code values, causing operational failures.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10A depicts signal behavior of the tunable edge chasing cell 900 in accordance with one embodiment.

FIG. 10B depicts signal behavior of the tunable edge chasing cell 900 in additional aspects.

DETAILED DESCRIPTION

Figure 1:
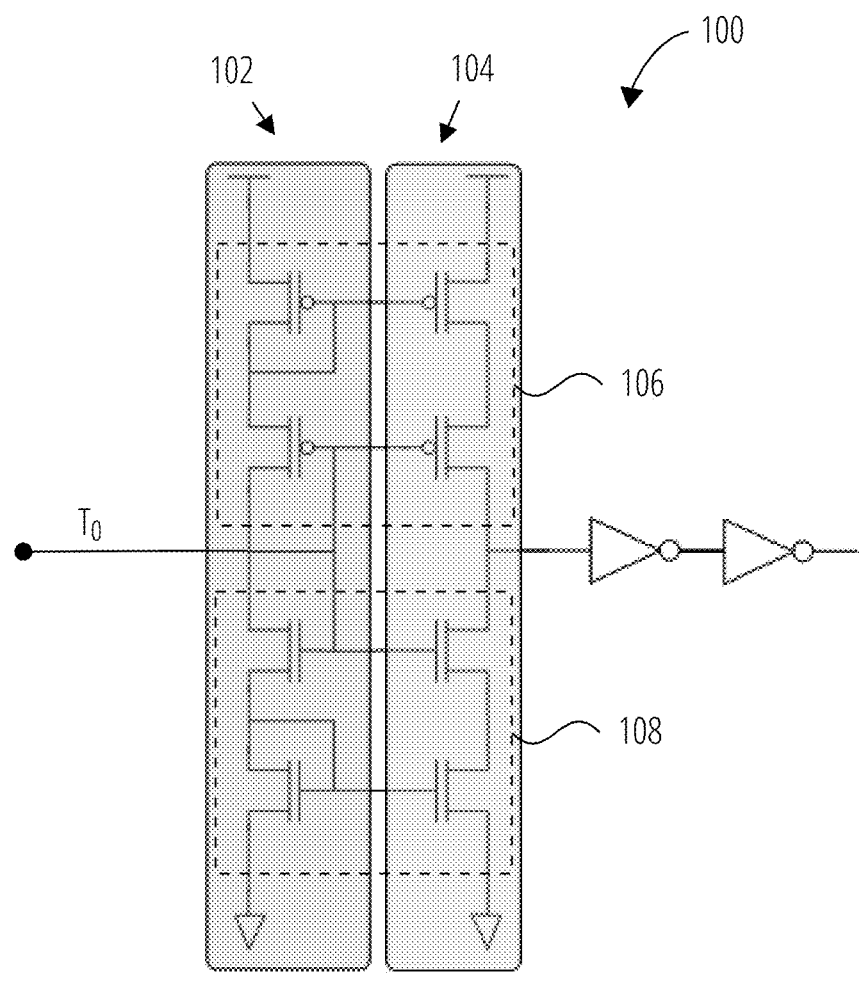
FIG. 1 depicts a conventional bit generating cell 100.

To more clearly articulate the description of exemplary embodiments, the following terms are introduced.

An adjustable current mirror is a circuit configured such that the amount of current that is mirrored on different branches of a current mirror may be adjusted with a control signal.

A bit generating cell is any circuit that generates an output valued at binary "1" or "0".

A current mirror is any of a variety of circuit topologies that generates substantially identical current in different branches of the circuit.

A fixed current mirror is a current mirror that is not adjustable.

An NFET unit is the sub-cell of a bit generating cell comprising NFET transistors.

A PFET unit is the sub-cell of a bit generating cell comprising PFET transistors.

The transition voltage trigger value is the level of an input signal to a bit generating cell that results in a "1" to "0" transition of the output value, or vice versa.

An unclonable cell array is a collection of bit generating cells that utilize manufacturing process variations to generate output values that differ from those of other unclonable cell arrays having the same circuit structure and components, but that were manufactured on a different die. Changes in operating conditions such as temperature, voltage, and aging of the die may result in different values generated by the unclonable cell array at different instance in time.

Chips may be subjected to processes that accelerate aging-related characteristics before they are used in the field. Aging may be applied to improve the reliability of PUF cells by shifting device characteristic in a direction that improves the cell behavior with respect not only to aging but also environment variations. Embodiments of processes are disclosed herein where the output of PUF cells is read, and then the PUF cells are reconfigured with a bias to output an opposite value, and then age them during enrollment. The aging process may be accelerated using higher temperatures and voltages than would be applied in field operating conditions (nominal voltage/temperature), to reduce the enrollment time. Non-volatile memory devices utilized as PUF cells may also achieve reconfiguration of the intrinsic device characteristic when higher than nominal voltage is applied.

In one aspect, a method for improving the stability of a bit pattern generating circuit (e.g., a PUF array) includes reading output values of the bit pattern generating circuit under an unbiased condition, reading the output values under a biased condition (in either order), identifying particular cells of the bit pattern generating circuit that flipped the output values between the unbiased condition and the biased condition, and subjecting at least some of the particular cells to accelerated aging to generate aged cells. In some embodiments, only the particular cells are aged.

The bias condition in some embodiments involves a setting for a current ratio. The bias condition in other embodiments is a setting to alter timing of an edge propagation through an edge chasing oscillator.

The method may also include setting the bias condition on the particular cells during the accelerated aging, where accelerated aging can involve subjecting the particular cells to a higher than nominal operating voltage, temperature, or both.

Outputs of cells of the bit pattern generating circuit may be enabled to contribute to the bit pattern (enrollment of the cells), excepting outputs of the particular cells from the bit pattern.

The method may further include a second enrollment pass that involves reading output values of the aged cells under the normal operating range condition, reading output values of the aged cells under the upper operating range condition, and identifying particular aged cells that did not flip output values between the normal operating condition and the upper operating range condition. The outputs of the particular aged cells may be enrolled to contribute to the bit pattern, excepting outputs of the aged cells that flipped output values.

In some embodiments, at least one of the cells is a current mirroring cell that includes a PMOS stage and an NMOS stage, and the bias condition includes setting a maximum current ratio on the PMOS stage.

In some embodiments, at least one of the cells is a current mirroring cell that includes a PMOS stage and an NMOS stage, and the bias condition includes setting a maximum current ratio on the NMOS stage.

In some embodiments, at least one of the cells is a current mirroring cell that includes a PMOS stage and an NMOS stage, and the bias condition includes setting a maximum current ratio on both of the PMOS stage and the NMOS stage.

Figure 3:
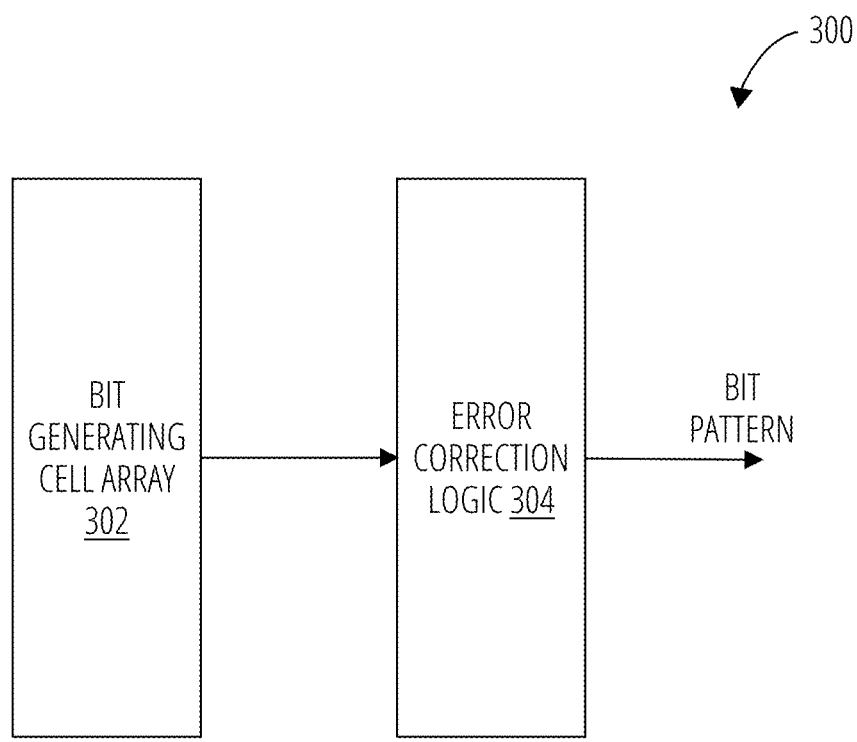
FIG. 3 depicts an unclonable bit pattern generator 300 in accordance with one embodiment.

FIG. 3 depicts an unclonable bit pattern generator 300 in one embodiment. The unclonable bit pattern generator 300 generates a bit pattern by utilizing a bit generating cell array 302 follow by error correction logic 304. The bit pattern may be applied for many purposes, including as a key for digital authentication and/or encryption. One challenge associated with the use of unclonable bit pattern generator 300 is that the output values of individual bit generating cells may vary over time under different operating conditions such as temperature, supply voltage and circuit aging. To remedy this problem, the bit generating cell array 302 output may feed into the error correction logic 304 to compensate for the unstable nature of some cells. As the number of unstable cells increases the complexity of the error correction logic 304 increases. By detecting unstable cells and reducing the percentage of unstable cells in operation over time the error correction logic 304 may be substantially simplified, improving performance, improving reliability, reducing circuit area, and potentially reducing cost.

Figure 4:
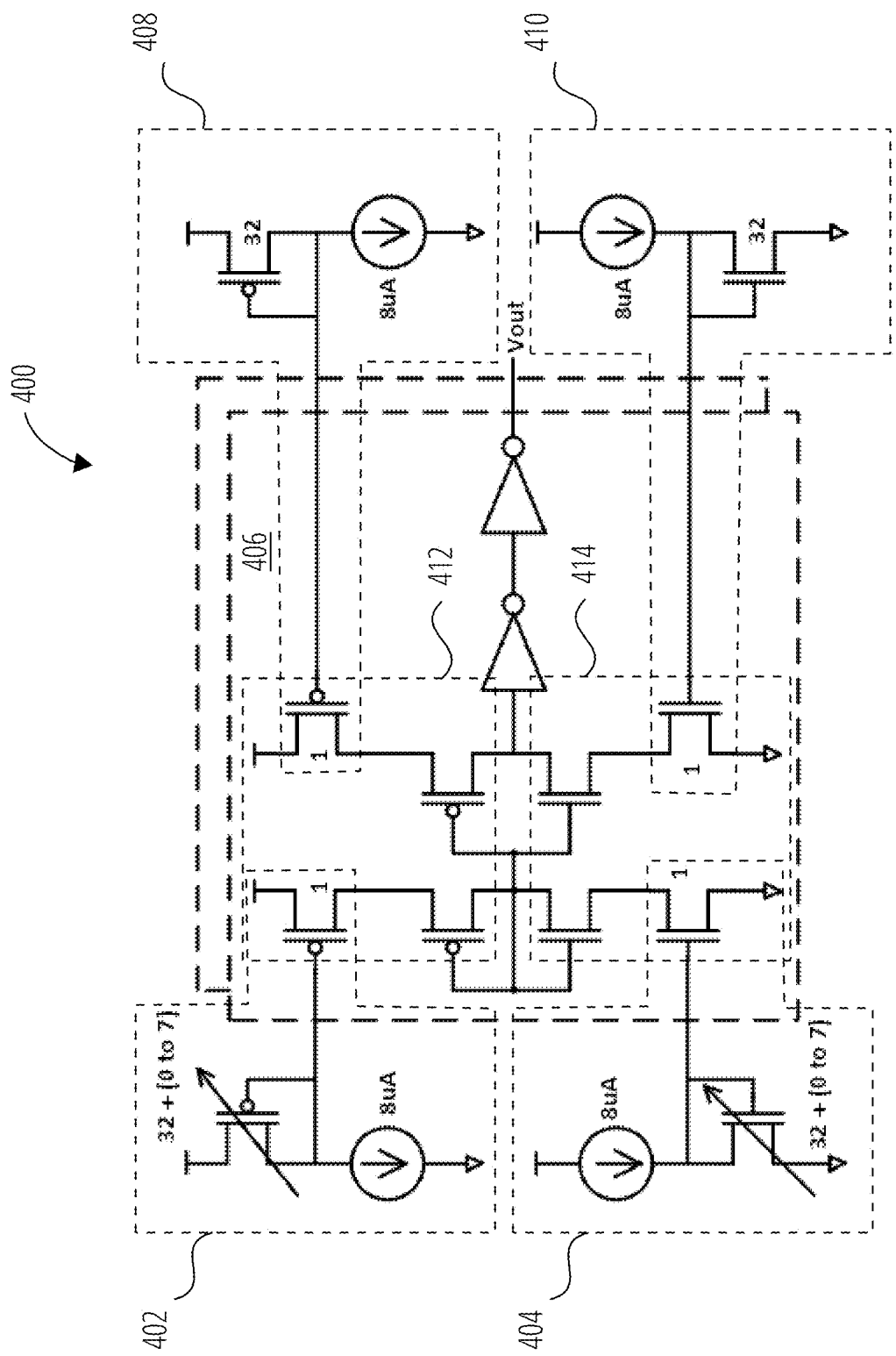
FIG. 4 depicts a tunable current mirror cell 400 in accordance with one embodiment.

FIG. 4 depicts a tunable current mirror cell 400 that may be utilized in the bit generating cell array 302 in one embodiment. The tunable current mirror cell 400 utilizes adjustable current mirrors 402, 404 on input stage transistors of the bit generating cell 406, and fixed current mirrors 408, 410 on output stage transistors of the bit generating cell 406. PFET-type current mirrors are applied to the PFET unit 412 of the bit generating cell 406, and NFET-type current mirrors are applied to the NFET unit 414 of the bit generating cell 406. In another embodiment, current mirrors 402, 404 are fixed current mirrors, and current mirrors 406, 408 are adjustable current mirrors. The description can be readily understood in regards to either embodiment.

In one embodiment, during normal operation (not detection mode), the size of the current mirrors may be set to a ratio of n:1, for example 32:1. When operated in detection mode, the fixed current mirrors 408, 410 are maintained at a ratio of n:1. The ratio of the adjustable current mirror 402 is first changed to (n+k):1 (e.g., with k variable from 0 to 7 using a three bit control code, although k can generally vary between over any practical range and correspond to any practical current step increment), while maintaining the ratio of the adjustable current mirror 404 at n:1, shifting the transition voltage downwards. The output voltage of the bit generating cell 406 is recorded for this setting. The same operation is repeated with roles of the adjustable current mirror 402 and adjustable current mirror 404 switched, shifting the transition voltage upwards. Again, the output of the bit generating cell 406 is recorded. The two recorded outputs are compared to generate a map of bit generating cells that have different values during the two measurements. These represent the cells that are less stable.

In somewhat more sophisticated embodiments, the actual width of the transition voltage windows may be recorded, rather than or in addition to the output values, providing a more detailed characterization of stability and robustness of the stability of individual cells.

In one embodiment, the detection process may be carried out once or periodically and identifications of the unstable cells may be stored in a non-volatile memory. Alternatively, the detection process may be carried out every time the bit pattern (e.g., key) is needed.

The width of the transition window (corresponding to ranges of the code values to the adjustable current mirrors) that thresholds what is considered an unstable cell may be configurable. Wider windows may result in more stable cells being characterized as unstable, whereas narrower windows may result in some unstable cells escaping detection.

In one embodiment, potentially unstable bit generating cells are detected by varying the midpoint voltage or transition voltage of one of the branches of the PFET unit/NFET unit stack, to identify cells in which the transition voltage trigger values of the different branches are close in value (i.e., within some configured tolerance of separation).

Figure 5B:
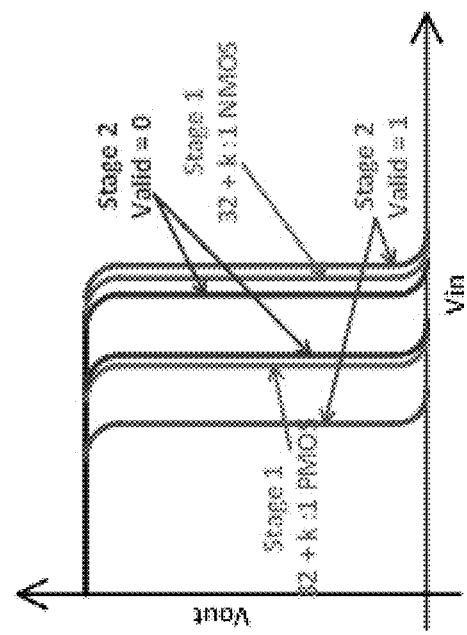
FIG. 5B depicts the signal behavior of the tunable current mirror cell 400 in additional aspects.
Figure 5A:
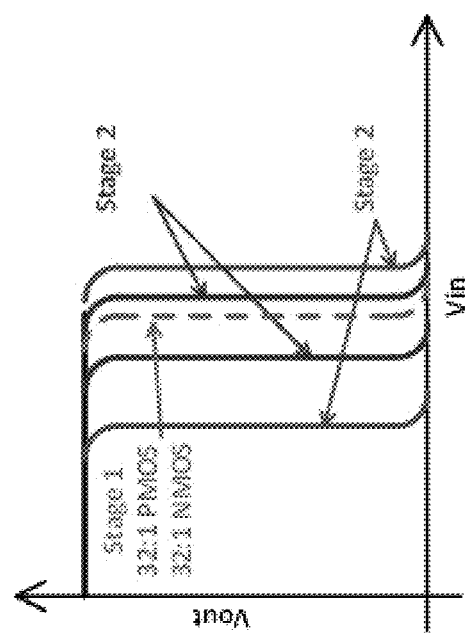
FIG. 5A depicts signal behavior for the tunable current mirror cell 400 in accordance with one embodiment.

In FIG. 5A, the transition voltage of the input stage 102 for a configured default setting of input current is depicted by the green dotted line. The transition voltage of the output stage 104 may be any one of the four other solid curves. The current to the input stage 102 is varied so that the transition voltage of the input stage 102 is both less than and more than for the default setting (FIG. 5B), creating a window around the default transition point. The unstable cells may be detected by examining the output value of the bit generating cell. Cells with output values that flip for small changes (i.e., a configured range) of the transition voltage trigger value are the ones that have a tendency to become unstable with operational process variations (lighter gray curves). The bit generating cells with output voltages that do not flip value within this window of change are the cells that may be consider stable (darker transition voltage curves) and therefore selected and applied to generate bit patterns such as authentication and/or encryption keys.

Figure 6:
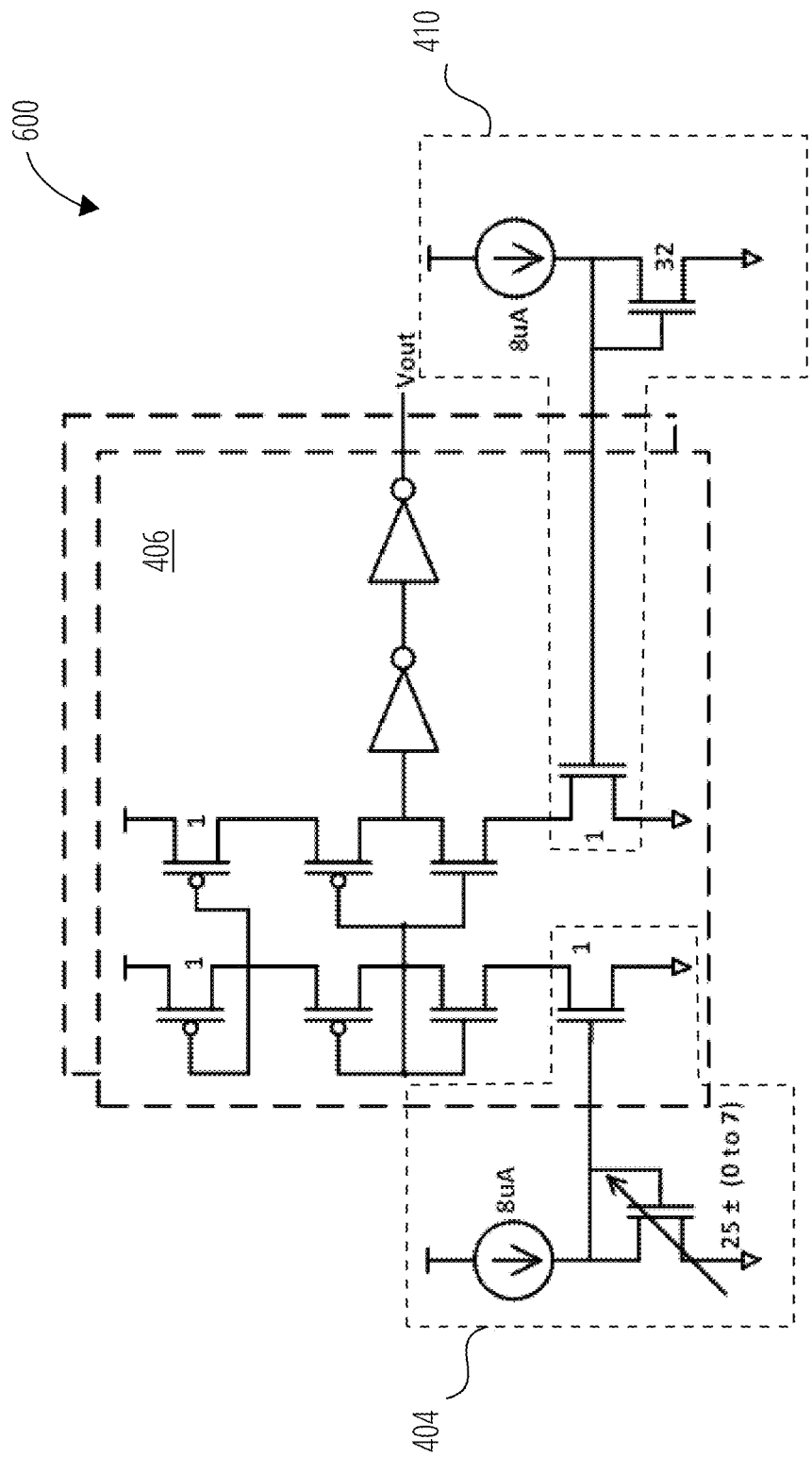
FIG. 6 depicts a tunable current mirror cell 600 in accordance with another embodiment.

FIG. 6 depicts another embodiment of a tunable current mirror cell 600 in which current mirrors 404, 410 are applied only to the NFET unit 414 of the bit generating cell 406. Likewise, yet another embodiment may apply current mirrors (e.g., 402, 408) to only the PFET unit 412 of the bit generating cell 406. This embodiment utilizes only two current mirrors to the bit generating cell 406. This may simplify circuit routing and reduce circuit area/power consumption.

Figure 7:
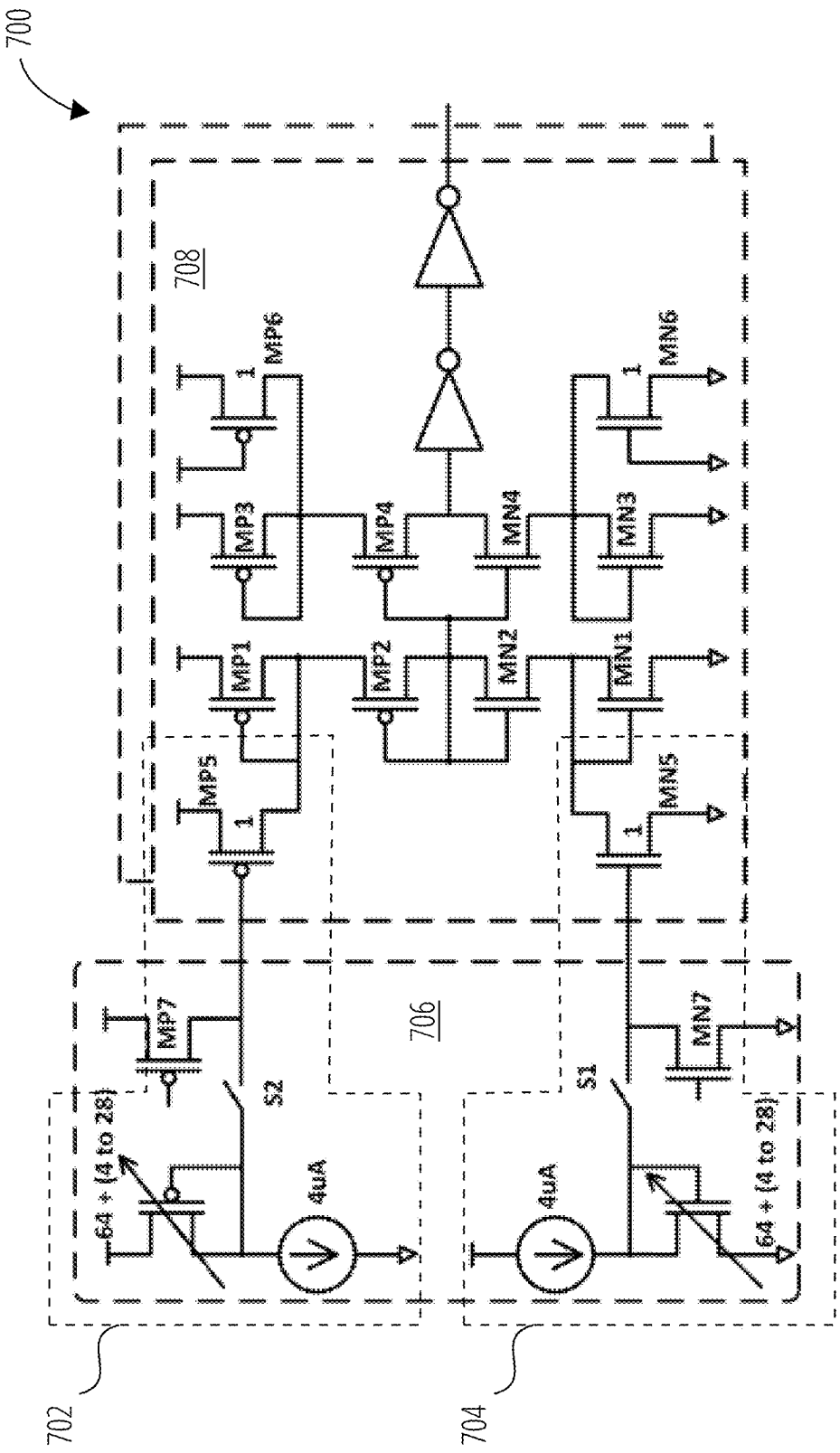
FIG. 7 a tunable current mirror cell 700 in accordance with yet another embodiment.

FIG. 7 depicts a tunable current mirror cell 700 in one embodiment in which adjustable current mirrors 702, 704 of a current source 706 are applied only to transistors of the input stage of the bit generating cell 708. Fixed current mirrors on the output stage are not utilized in this embodiment.

In the tunable current mirror cell 700, the adjustable current mirrors 702, 704 are coupled in parallel with the self-biased current sources (MN1, MN3, MP1, MP3). The adjustable current mirror 702 and adjustable current mirror 704 comprise transistors MN5 and MP5 whose gate-source voltage $V_{gs}$ is controllable. The transistors MN6 and MP6 are dummy transistors for matching purposes to MN5 and MN6, respectively, and are always turned OFF.

During the detection process either of the switch S1 or S2 is closed and the corresponding pull-down or pull-up transistor MN7 or MP7 is turned OFF. The mirroring ratio of the corresponding adjustable current source is adjusted to the configured window width as described previously. This process is performed sequentially once for the NMOS unit and then again for the PMOS unit. Cells exhibiting an output flip are noted as unstable.

During normal operation, the switches S1 and S2 are both open and the adjustable current sources 702, 704 are isolated from the 708. The pull-up and pull-down transistors (MP7 and MN7) are both turned ON to set the $V_{gs}$ of MN5 and MP5 to (ideally) 0V.

This implementation utilizes only two adjustable current sources. Additionally, during normal operation there is no input from the current sources which helps ensure that any bias in the current source does not influence the bit generating cell 708 output during normal operation.

Figure 8A:
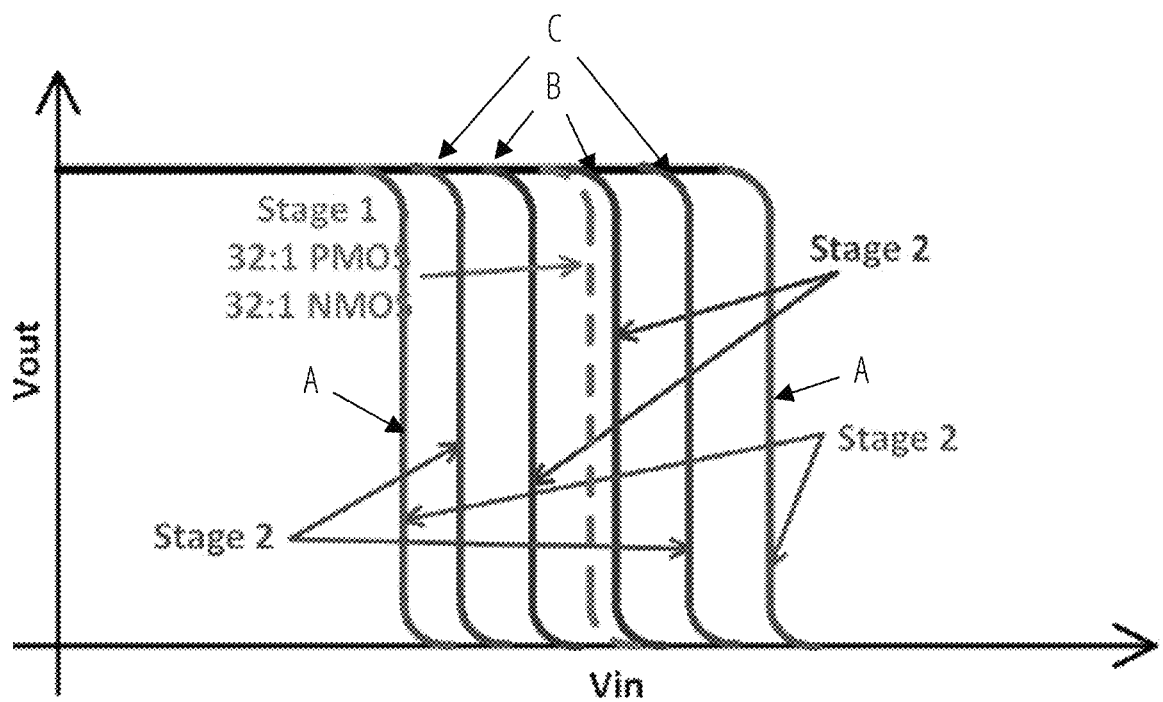
FIG. 8A and FIG. 8B depict examples of PUF cell input-output characteristics.
Figure 8B:
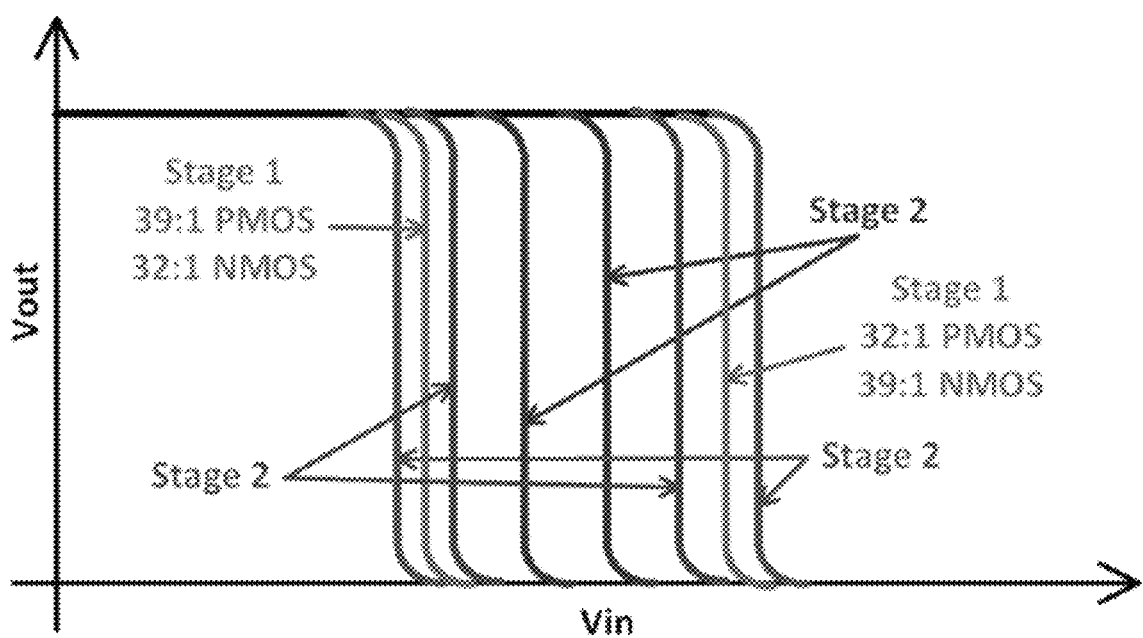

FIG. 8A and FIG. 8B depict examples of PUF cell input-output characteristics. Exemplary characteristics stages one and two in a current mirror PUF cell (see FIG. 4) are depicted in FIG. 8A. The dotted line represents the characteristic of stage one and solid lines represent the characteristic of stage two. The stage one characteristic can be modified from a nominal, "unbiased" state (e.g., a mirror ratio of 32:1) by changing the current mirror ratio (herein, the "biased" condition), for example using JTAG controls. Stage two characteristics can likewise be modified.

When the stage one characteristic are changed to the configurable maximum extent as depicted in FIG. 8B (e.g., from a ratio of 32:1 to 39:1 in this example) all the cells with stage two characteristic labeled "A" do not retain the same value as the default without any stage one modification. However, cells with stage two characteristics labeled "B" and "C" will flip from their default (field operable, unbiased) value. These are the cells that are subjected to aging to improve their stability, as they are susceptible to become unstable. The cells that flipped are enabled and have their current mirror ratio set to the maximum ratio, so that the output of these cells is opposite of the default value. With this state imposed, an accelerated aging process is carried out on these cells. A corresponding process of detection, enrollment, and aging is depicted and described in conjunction with FIG. 11.

Figure 9:
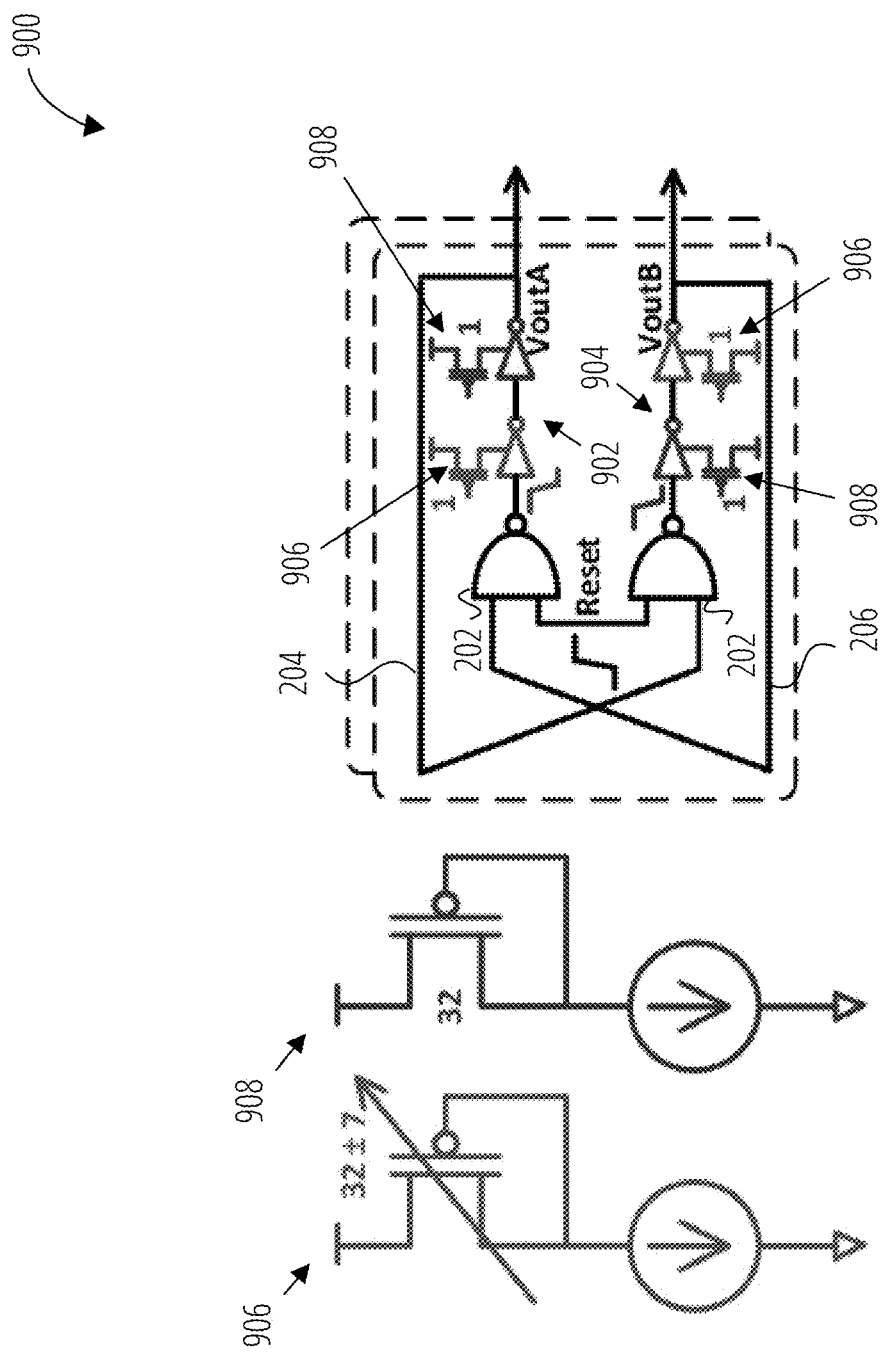
FIG. 9 depicts a tunable edge chasing cell 900 in accordance with one embodiment.

FIG. 9 depicts a tunable edge chasing cell 900 in one embodiment. The tunable edge chasing cell 900 may typically include an even number of delay elements on each loop 204, 206. One or more of the delay elements 902, 904 on each loop is coupled to an adjustable current sources 906, enabling the delay introduced by those elements into the loops to be tuned (adjusted up or down). Delay elements that are not coupled to an adjustable current source 906 may be coupled to fixed current sources 908 to hold their delay constant.

Adjustable current sources are coupled to certain ones of the delay elements in one or more of the loops of the tunable edge chasing cell 900. Different delay elements impact the timing of different edges, which can be controlled using the current sources. The timing of the edge depicted by the dotted line (FIG. 10A), for example, may be controlled to lag or follow the edge marked with an "X" as depicted in FIG. 10B. The detection of unstable cells follows the process described previously, with one difference. Instead of varying the internal transition voltage of the bit generating cell, the delay of delay elements (e.g., current-starved inverter cells) is varied. The delay of some delay elements may be held constant (with constant current sources) whereas one or more other delays are varied, to create a delay window around a configured default value. The cells selected for application are those whose output values do not flip even when the delay of the edge(s) is varied across a sufficiently wide configured range of values.

Figure 11:
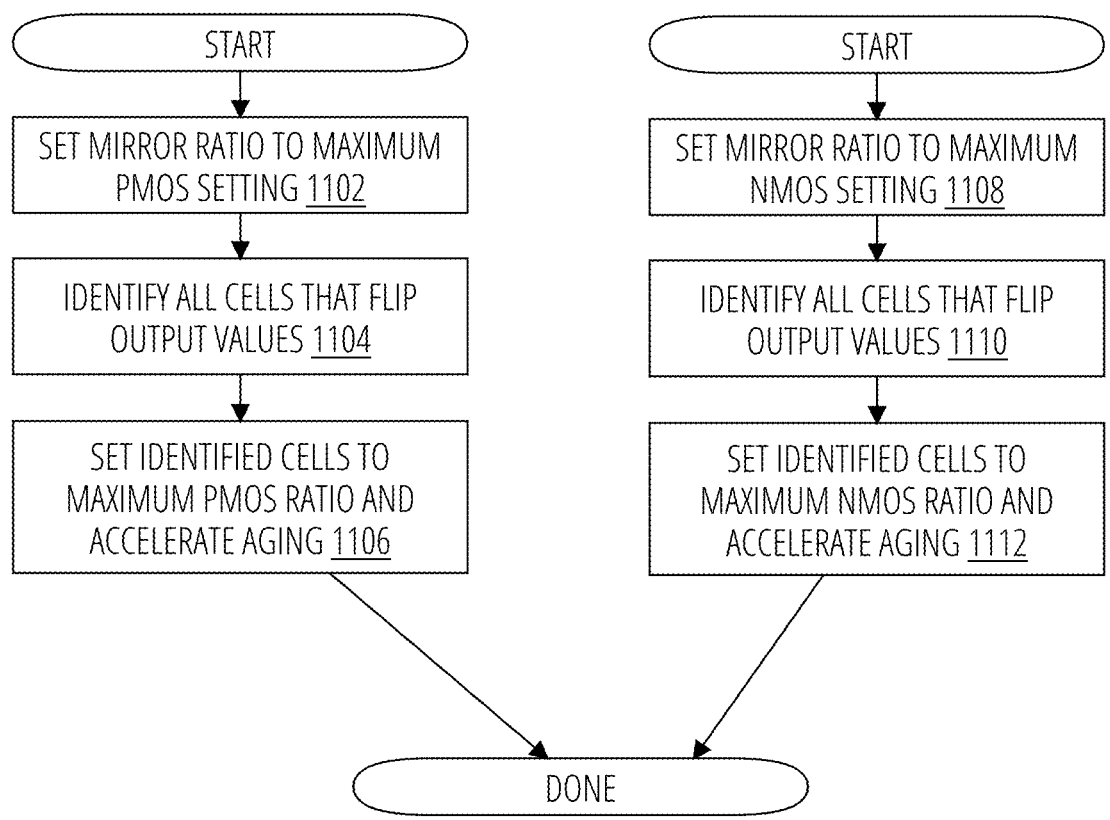
FIG. 11 depicts a PUF cell aging process in accordance with one embodiment.

In the process of FIG. 11, the current mirror ratios are set to their maximum levels (or within some tolerance thereof) for one or both the PMOS input stages (block 1102) and the NMOS input stages (block 1108) of a current mirror cell PUF array. This is referred to herein as the biased condition on the cells. The cells that flip values are identified (block 1104 and block 1110). To accelerate aging of the identified cells, their current mirror ratios are set (or maintained, if already set) at the maximum levels (block 1106 and block 1112), whereas cells that didn't flip values are not set to the maximum ratios to avoid premature aging of those cells. The cells that did not flip values may be enrolled after this step, and the cells subjected to aging may be enrolled subsequent to aging. In one embodiment, the process may be repeated on the aged cells to identify any remaining that flip their output values between the biased condition and the unbiased condition, and only the aged cells that do not flip values then enrolled.

Figure 12:
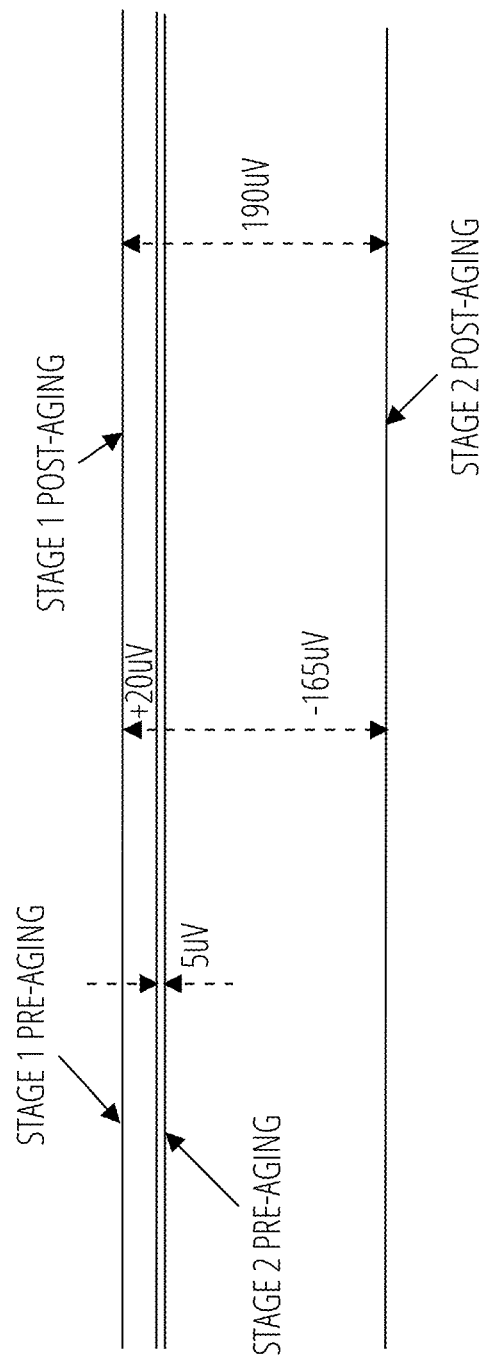
FIG. 12 depicts an example of aging effects on PUF cell characteristics.

FIG. 12 depicts an example of aging effects on PUF cell characteristics for a 5 nm fabrication process. A cell that exhibits a 5 uV difference between stage one output and stage two output before aging exhibits an increase to a 190 uV difference when aged using an applied supply voltage of 0.95V (0.75V being nominal voltage) and 105 C environmental temperature for approximately one day.

Figure 13:
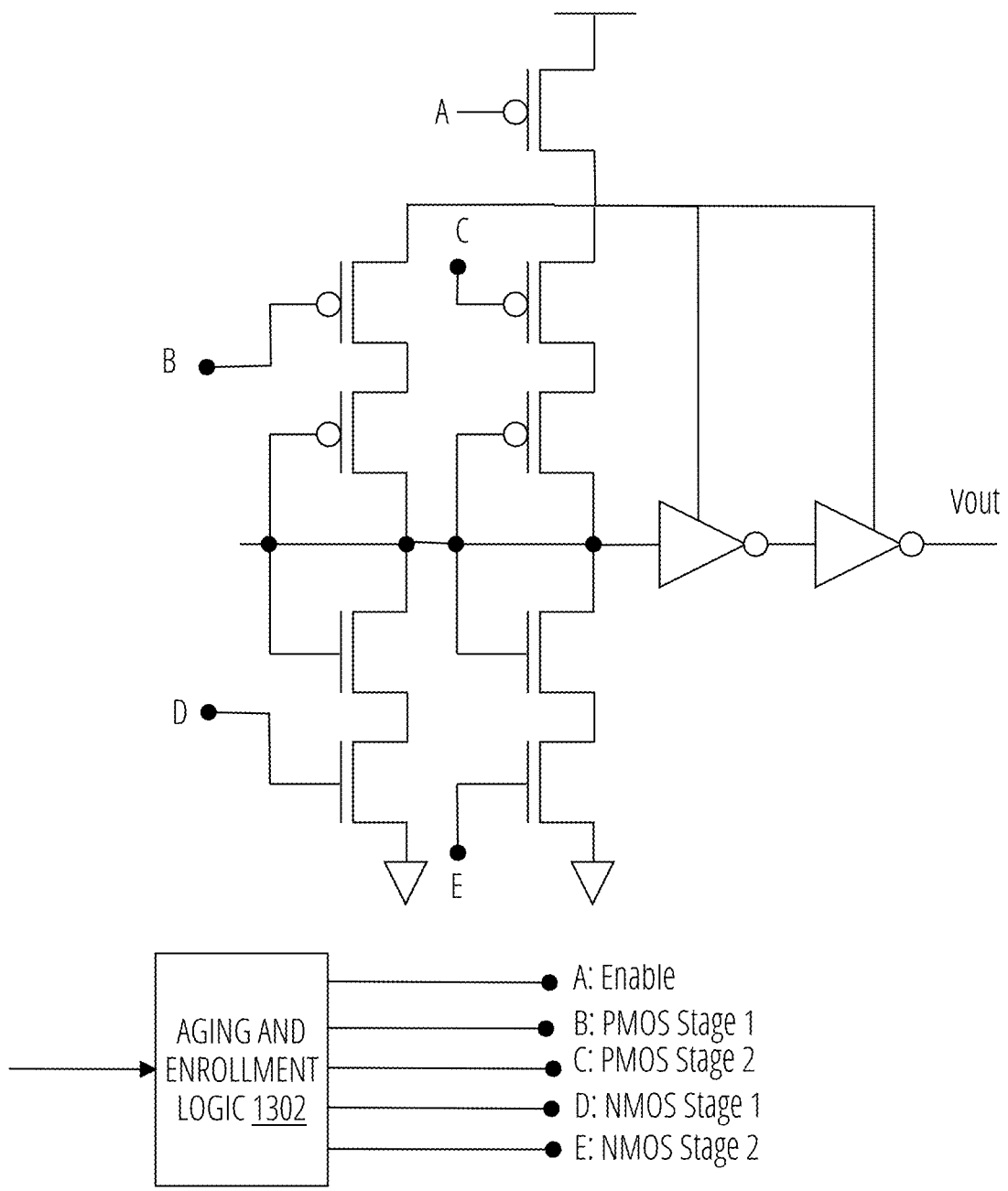
FIG. 13 depicts an embodiment of a PUF cell in one aspect.

The method depicted in FIG. 12 utilizes separate controls for setting the PMOS current mirror ratio and the NMOS current mirror ratio. FIG. 13 depicts an embodiment of a PUF cell with such aging and enrollment logic 1302 controls in one aspect. Manners of implementing the aging and enrollment logic 1302 to generate such controls in view of this disclosure will be readily apparent to those of ordinary skill in the art. Only the cells that flipped output values when the PMOS mirror ratio was set to maximum are enabled for aging, and the rest of the cells are disabled, and likewise for aging the cells that flipped when the NMOS mirror ratio was set to maximum. The enrollment time (time to execute the aging of all cells) is the time to age only the cells impacted by PMOS ratio modification plus the time to age the cells impacted by NMOS ratio modification. Also, the aging signals may not fully turn ON or OFF the different set of devices being aged. This may slow the aging process or age the devices less than optimally in the same given time.

Figure 14:
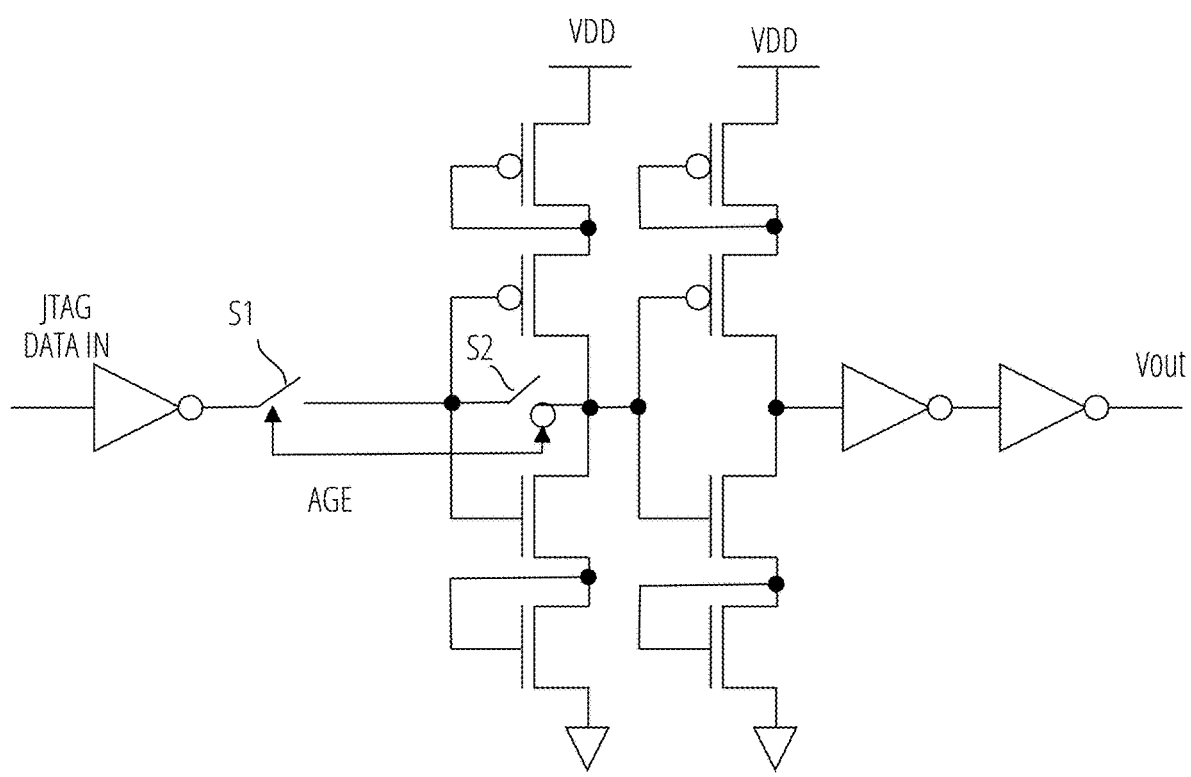
FIG. 14 depicts an embodiment of a PUF cell in another aspect.

FIG. 14 depicts an embodiment of a stacked current source PUF cell (e.g., as depicted in FIG. 1) with modifications to the first stage to enable selection of a normal operational mode or an aging mode (aging logic).

The control signal 'AGE' selects the mode of operation. When Age=1 switch S1 is closed and data is forced into the PUF from JTAG. When Age=0 the switch S1 is open and S2 is closed and the PUF operates in normal (field deployed) mode. In this implementation the NMOS and PMOS devices in the PUF cell are maintained fully ON or OFF and hence aging occurs faster than when they can take on states that are not completely ON or OFF. Additionally, all the PUF cells may be aged at the same time irrespective of the random value they initialize to.

Figure 15:
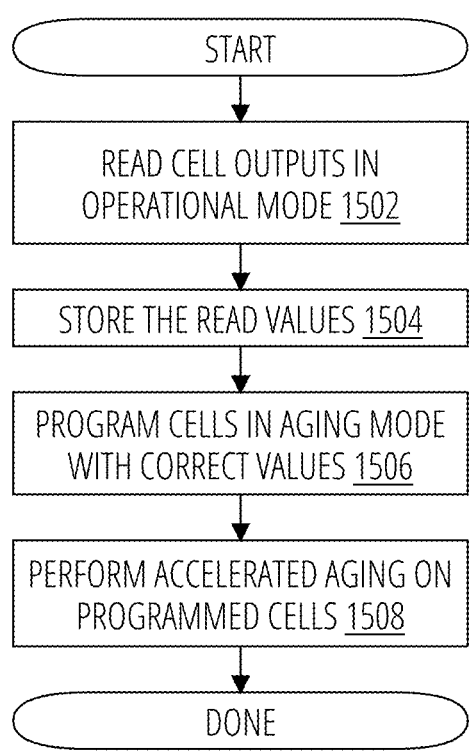
FIG. 15 depicts a PUF cell aging process in accordance with one embodiment.

FIG. 15 depicts a PUF cell aging process in accordance with one embodiment. The PUF cells are power cycled in operational mode (block 1502) and PUF array output is saved (block 1504). The correct outputs that the cells should have is loaded into a JTAG register and used to program the PUF array in aging mode (block 1506 and block 1508).

Figure 16A:
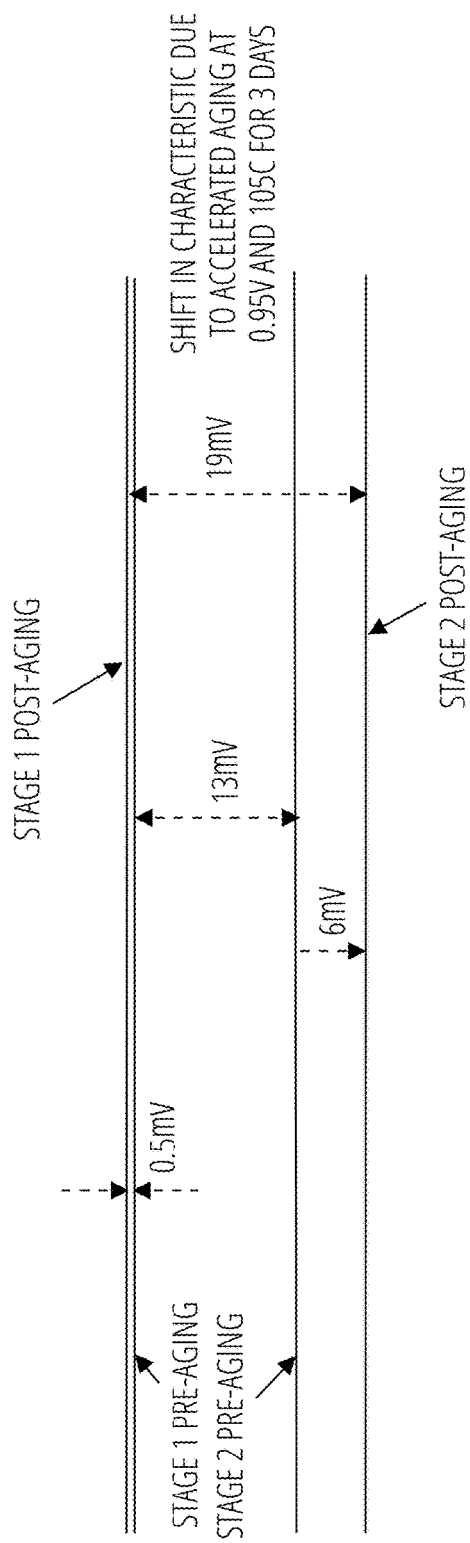
FIG. 16A and FIG. 16B depict examples of aging effects on PUF cell characteristics.
Figure 16B:
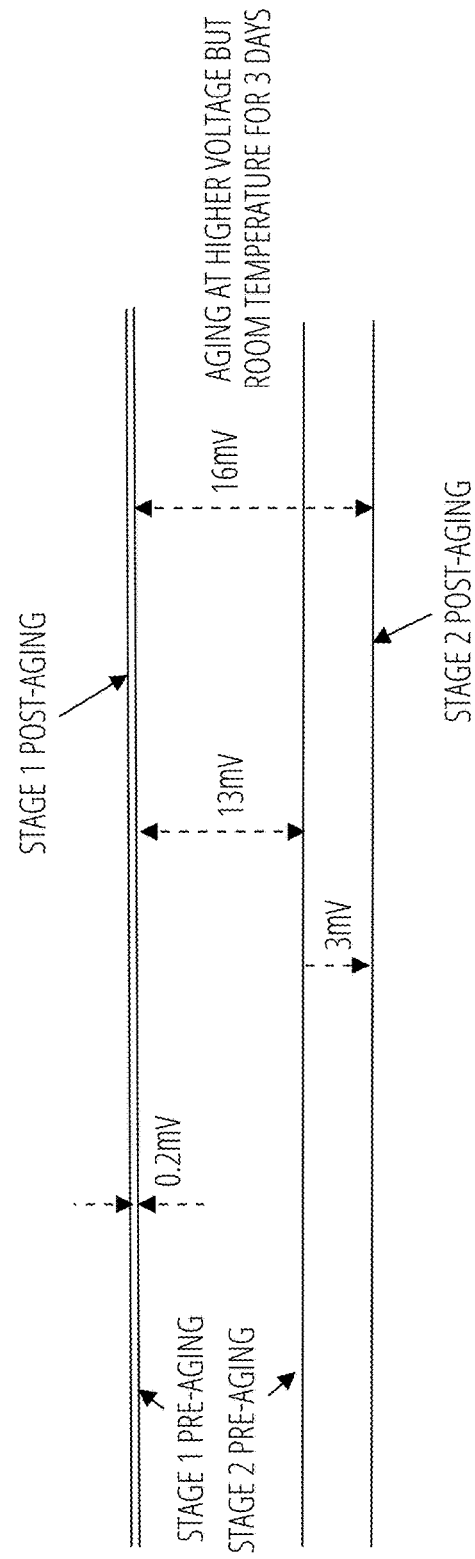

FIG. 16A and FIG. 16B depict examples of aging effects on PUF cell characteristics. In the example of FIG. 16A, the PUF cells are aged in an accelerated manner at 0.95 V and 105 C for three days to obtain the shift in characteristics depicted in the figure. FIG. 16B depicts an example of aging effects when the PUF cells are aged at room temperature.

Figure 17A:
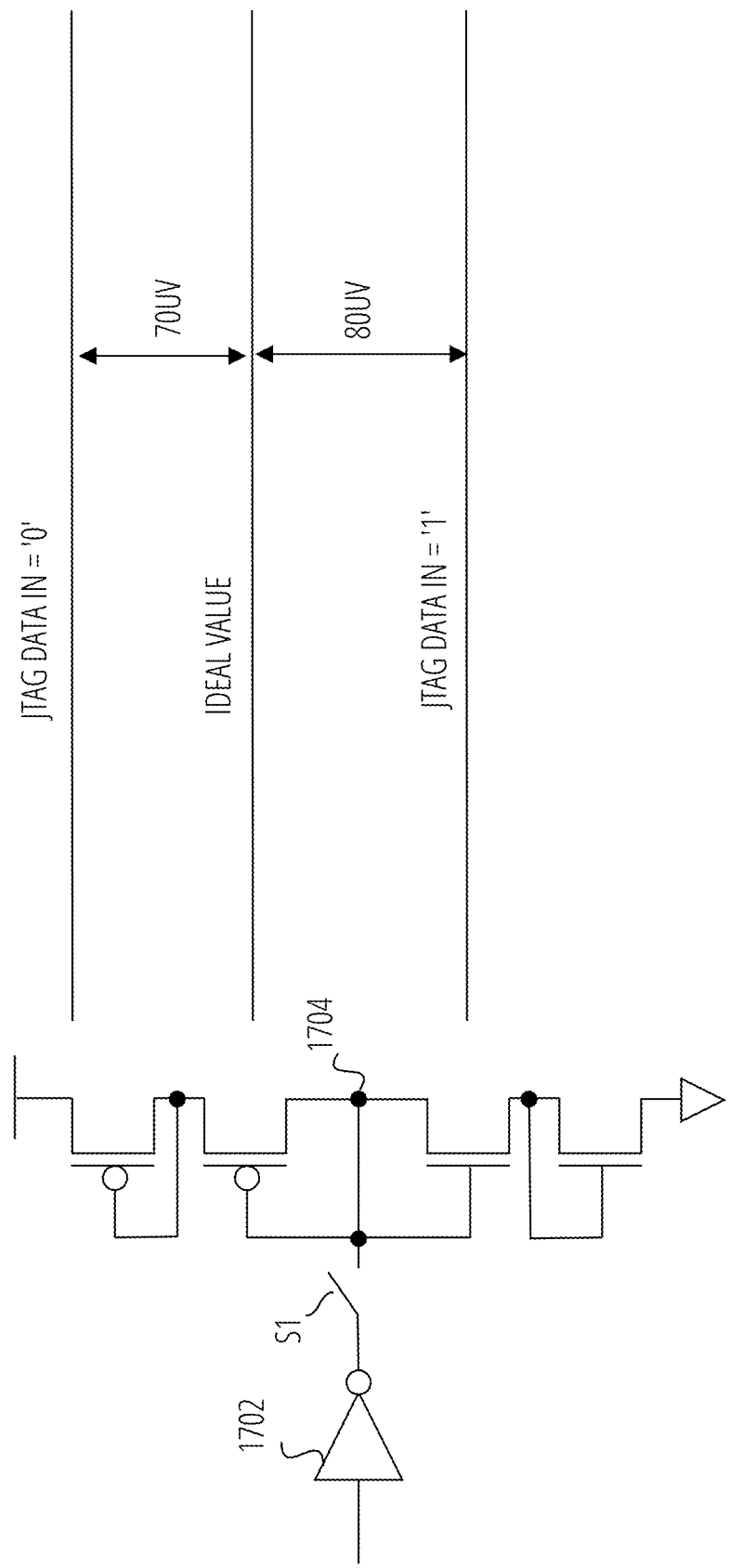
FIG. 17A and FIG. 17B depict examples of using JTAG to perform PUF cell aging.
Figure 17B:
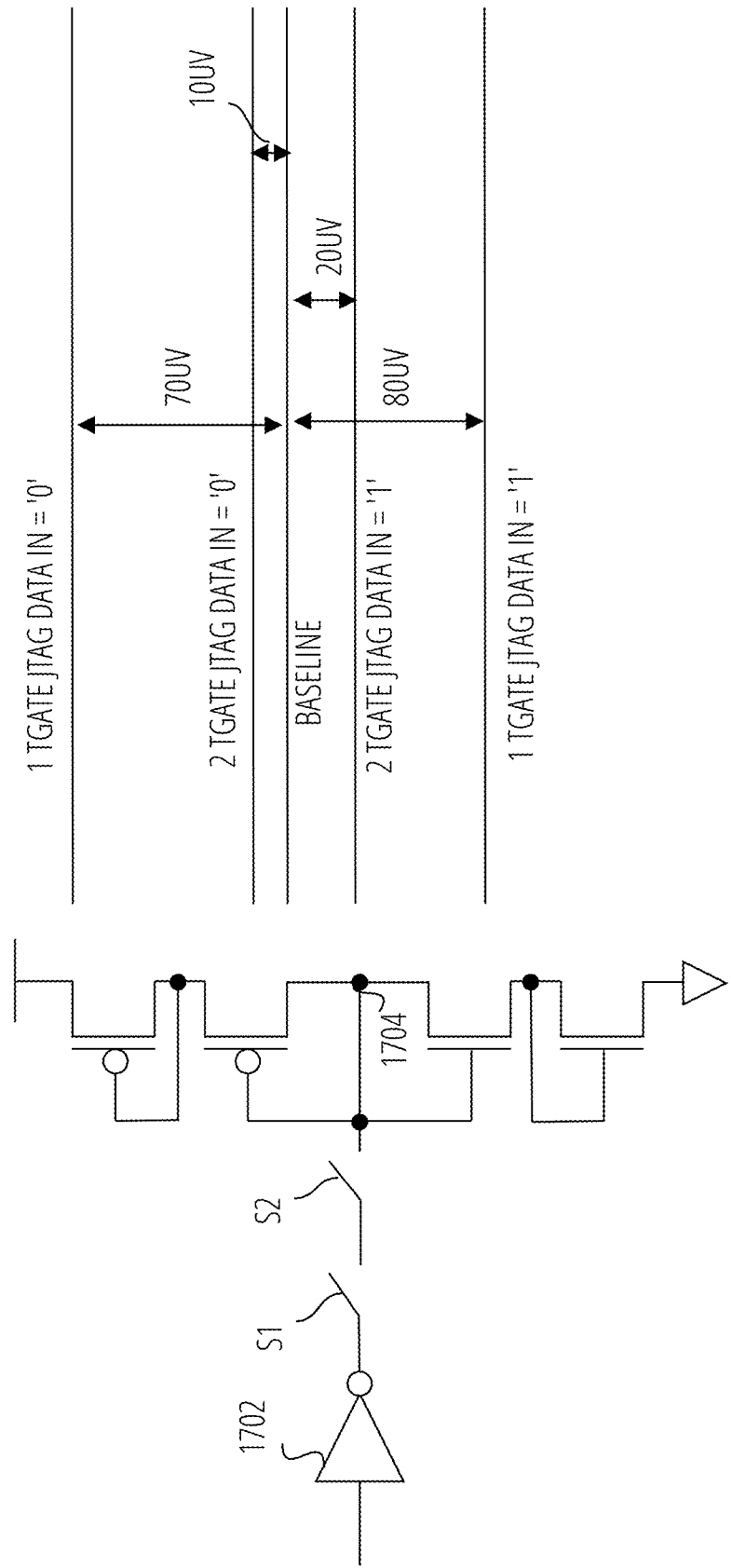
Figure 18:
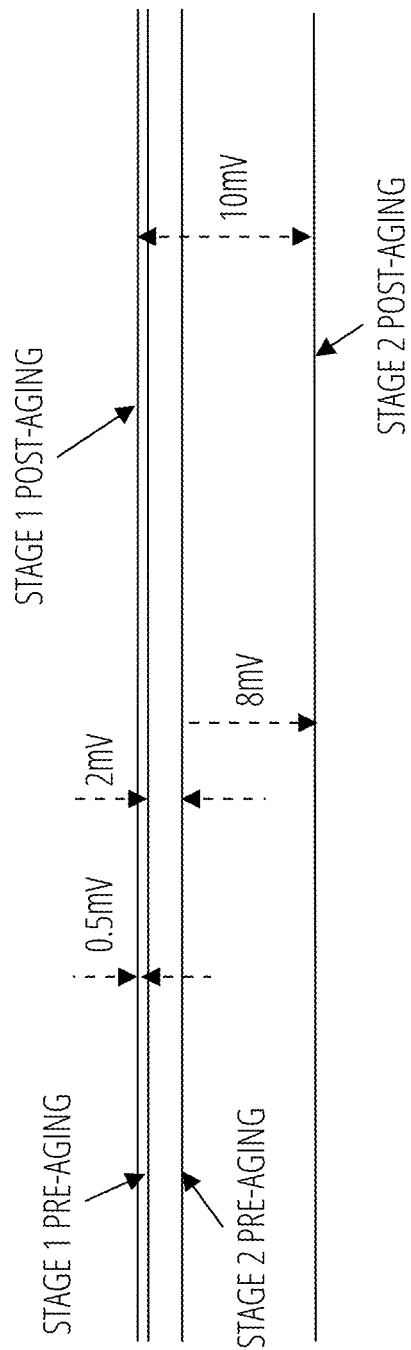
FIG. 18 depicts an example of aging effects on PUF cell characteristics.

FIG. 17A and FIG. 17B depict examples of using JTAG to perform PUF cell aging. The presence of inverter 1702 with switch S1 may impact the PUF operation even when the switch S1 is turned OFF in normal operation mode. The voltage at stage one node 1704 is shifted up and down by around 70/80 uV depending on the programmed value of JTAG data in normal operation mode. This may bias some of the PUF cells towards a '1' or '0' output. To reduce these effects at node 1704, a second switch S2 is introduced that reduces the impact of JTAG data values at the input of the inverter 1702, from 70 uV/80 uV to 10 uV/20 uV. Aging results on cell characteristics using this latter approach are exemplified in FIG. 18.

Figure 2:
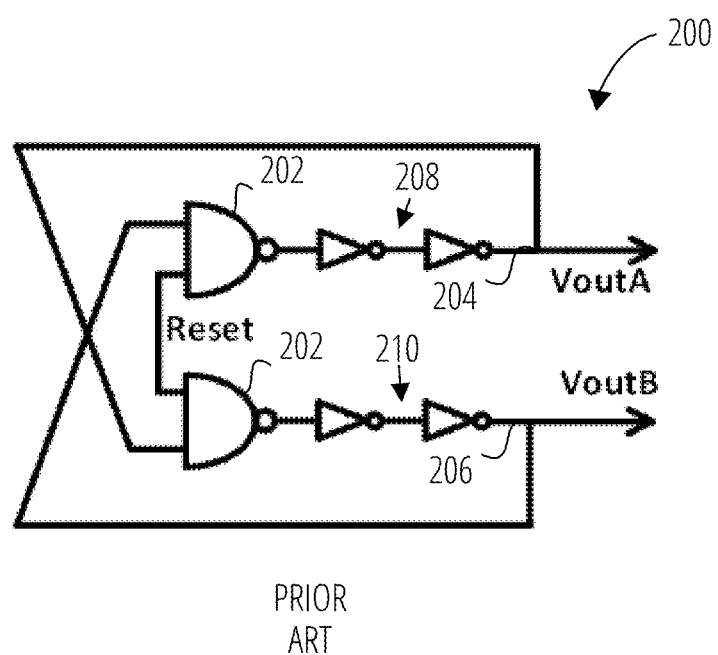
FIG. 2 depicts another type of conventional bit generating cell 200.
Figure 19:
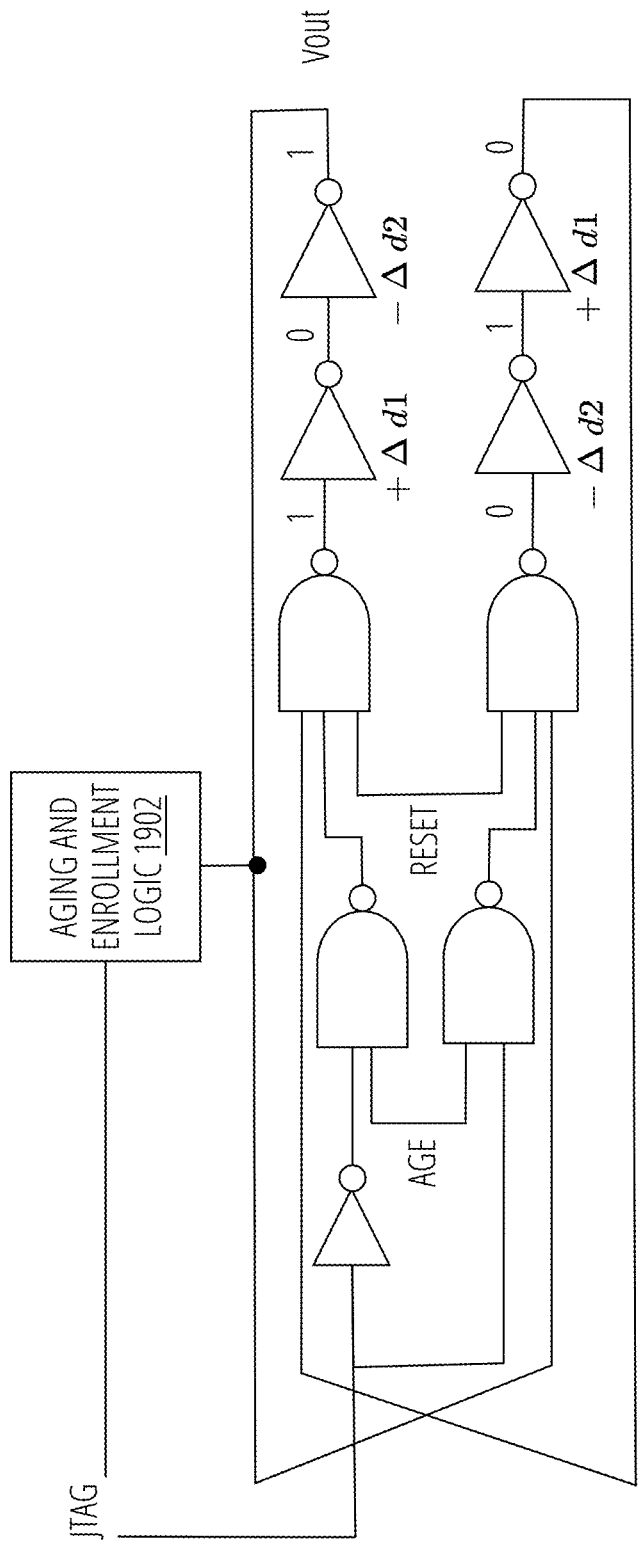
FIG. 19 depicts a PUF cell in one embodiment.

FIG. 19 depicts a PUF cell in one embodiment. The cell comprises an edge chasing oscillator (e.g., see FIG. 2) that further includes an interface to provide accelerated aging (aging logic) to improve its stability. The reset signal transitions from 0 to 1 to inject falling edges at the output of two NAND gates. Because of process variations, one of the edges emerges faster, catches up to the other edge, and the PUF cell settles to a either Vout=1 or Vout=0 after a number of cycles of oscillation.

This oscillator structure has an inherent averaging effect on both the device variation and noise. For each cycle, each edge passes through all the inverters, accumulating the device variations as well as the noise present at that moment. With a greater number of cycles, the noise of each node at the time window is accumulated for both falling edges, effectively averaging out the noise. This appears as an average effect when the variation is randomly distributed. However, with aging applied as depicted in FIG. 19, it manifests as an integration effect that amplifies the variation, stabilizing the output value of the PUF cell.

After the directional aging, the delay difference for one cycle becomes D1=D0+($\Delta d1+\Delta d2$)*2, where D0 is the delay difference before aging. Assuming the oscillation lasts for N cycles, the difference will be ($\Delta d1+\Delta d2$)*2N greater than before aging. It follows that adding more inverter stages to the cell increases the efficacy of aging.

During normal operation, the AGE signal is set low by the aging and enrollment logic 1902, disabling the external control. To cause aging, the aging and enrollment logic 1902 sets AGE to high, and JTAG is set to put each node into the aging state, which is opposite the state the cell would have after settling in normal operation. Therefore the aging and enrollment logic 1902 may set JTAG (the bias) to the saved value of Vout. Implementation of the aging and enrollment logic 1902 will be readily apparent to those of skill in the art in view of this disclosure.

Figure 20:
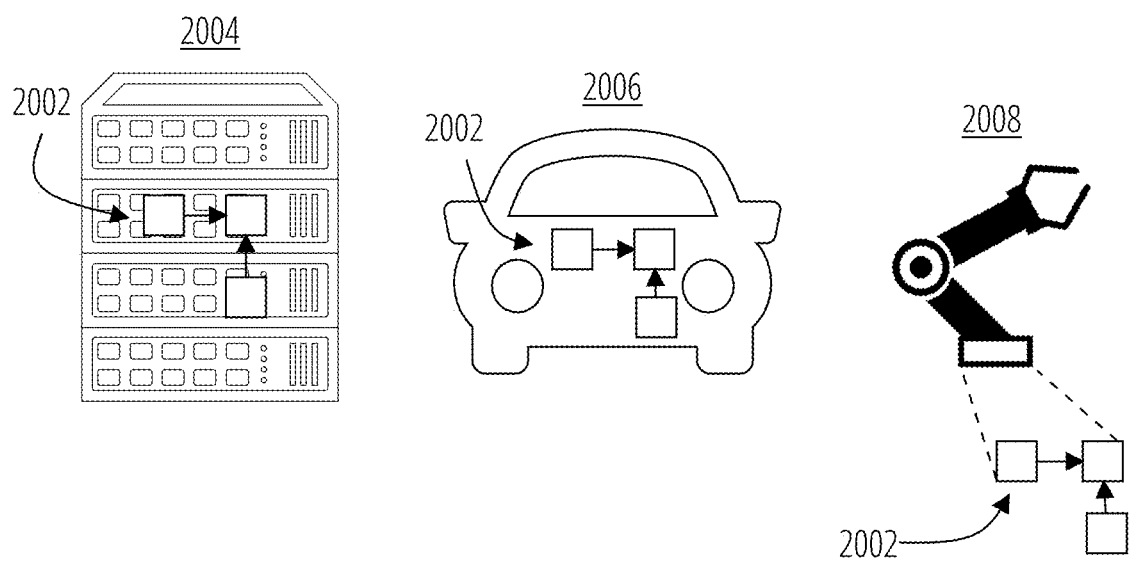
FIG. 20 depicts exemplary commercial applications of an unclonable cell array 2002.

FIG. 20 depicts exemplary scenarios for use of an unclonable cell array 2002 in accordance with some embodiments. An unclonable cell array 2002 may be utilized in a computing system 2004, a vehicle 2006, and a robot 2008, to name just a few examples. The unclonable cell array 2002 may output bit patterns to error correction logic to form authentication and encryption keys, for example. Generally, the unclonable cell array 2002 may be utilized anywhere a bit pattern is needed.

The circuits disclosed herein may be utilized in various kinds of computing devices in conjunction with software or other logic to authenticate and/or authorize use of an application, an app, drivers, or services on particular devices. In one particular embodiment, the system may be implemented as part of an authentication service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

Figure 21:
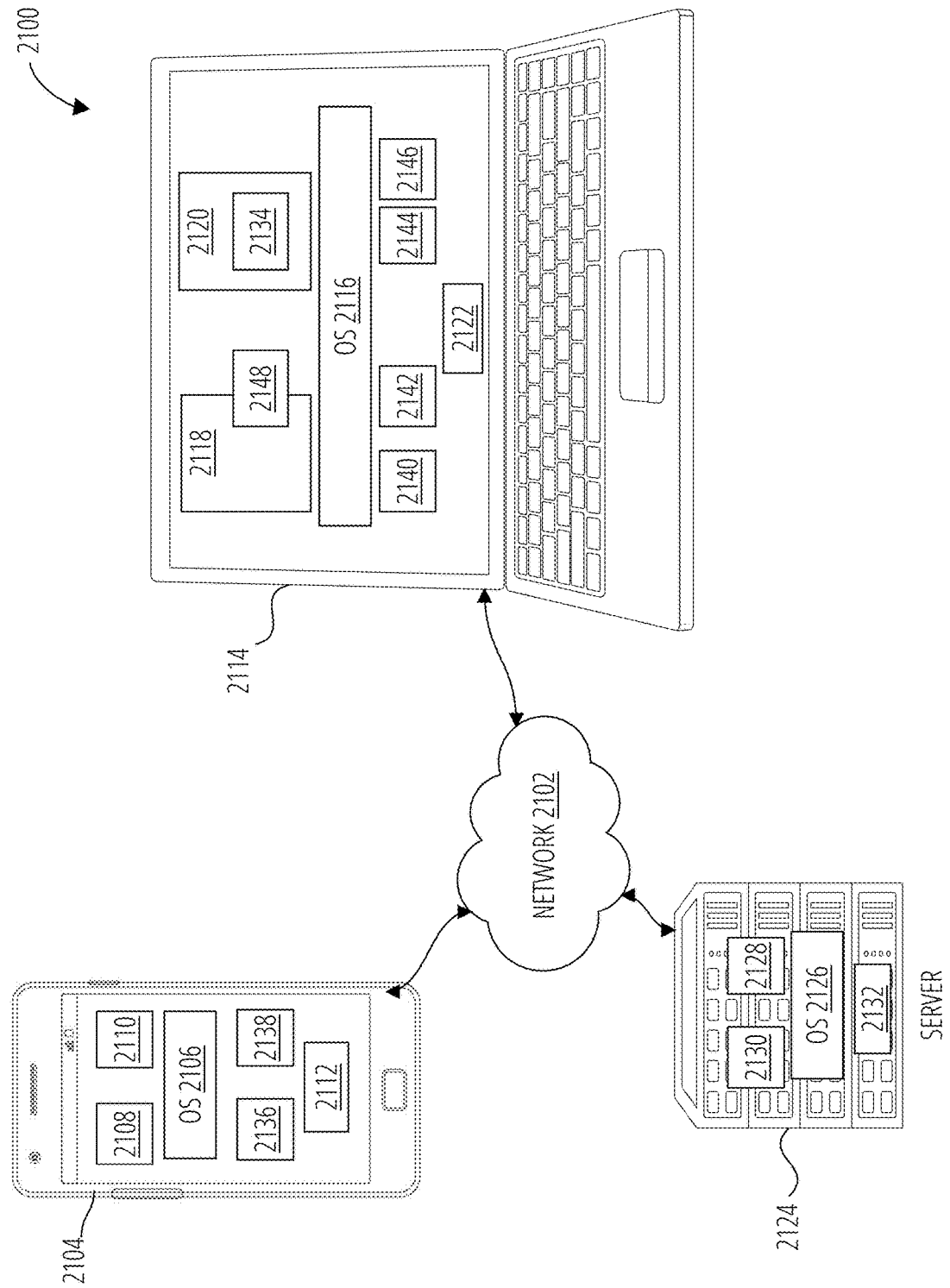
FIG. 21 depicts a computing environment 2100 in accordance with one embodiment.

Referring to FIG. 21, a computing environment 2100 illustrates various computer hardware devices and software modules coupled by a network 2102 in one embodiment. Each device includes a native operating system, typically pre-installed on its non-volatile RAM, and a variety of software applications or apps for performing various functions.

The mobile programmable device 2104 comprises a native operating system 2106 and various apps (e.g., app 2108 and app 2110). The mobile programmable device 2104 also comprises an unclonable bit array 2112. A computer 2114 includes an operating system 2116 that may include one or more library of native routines to run executable software on that device. The computer 2114 also includes various executable applications (e.g., application 2118 and application 2120), and an unclonable bit array 2122. The mobile programmable device 2104 and computer 2114 are configured as clients on the network 2102. A server 2124 is also provided and includes an operating system 2126 with native routines specific to providing a service (e.g., service 2128 and service 2130) available to the networked clients in this configuration. The server 2124 also comprises an unclonable bit array 2132.

In one embodiment, the unclonable bit array 2112 and the unclonable bit array 2122 are utilized to generate key values utilized to authenticate/authorize the mobile programmable device 2104 and computer 2114 to utilize services 2130, 2128 of the server 2124. In some embodiments, the key may also or alternatively be used for encrypted communication between these devices over the network 2102. The unclonable bit array 2132 of the server 2124 may in some embodiments be utilized to similar purpose, and/or to authenticate and/or communicate with other server devices (not depicted).

A compiler is typically used to transform source code into object code and thereafter a linker combines object code files into an executable application, recognized by those skilled in the art as an "executable". The distinct file comprising the executable would then be available for use by the computer 2114, mobile programmable device 2104, and/or server 2124. Any of these devices may employ a loader to place the executable and any associated library in memory for execution. The operating system executes the program by passing control to the loaded program code, creating a task or process. An alternate means of executing an application or app involves the use of an interpreter (e.g., interpreter 2134).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 2136 or driver 2138 on the mobile programmable device 2104 or computer 2114 (e.g., driver 2140 and driver 2142) might enable wireless headphones to be used for audio output(s) and a camera to be used for video inputs. Any of the devices may read and write data from and to files (e.g., file 2144 or file 2146) and applications or apps may utilize one or more plug-in (e.g., plug-in 2148) to extend their capabilities (e.g., to encode or decode video files).

The network 2102 in the computing environment 2100 can be of a type understood by those skilled in the art, including a Local Area Network (LAN), Wide Area Network (WAN), Transmission Communication Protocol/Internet Protocol (TCP/IP) network, and so forth. These protocols used by the network 2102 dictate the mechanisms by which data is exchanged between devices.

Figure 22:
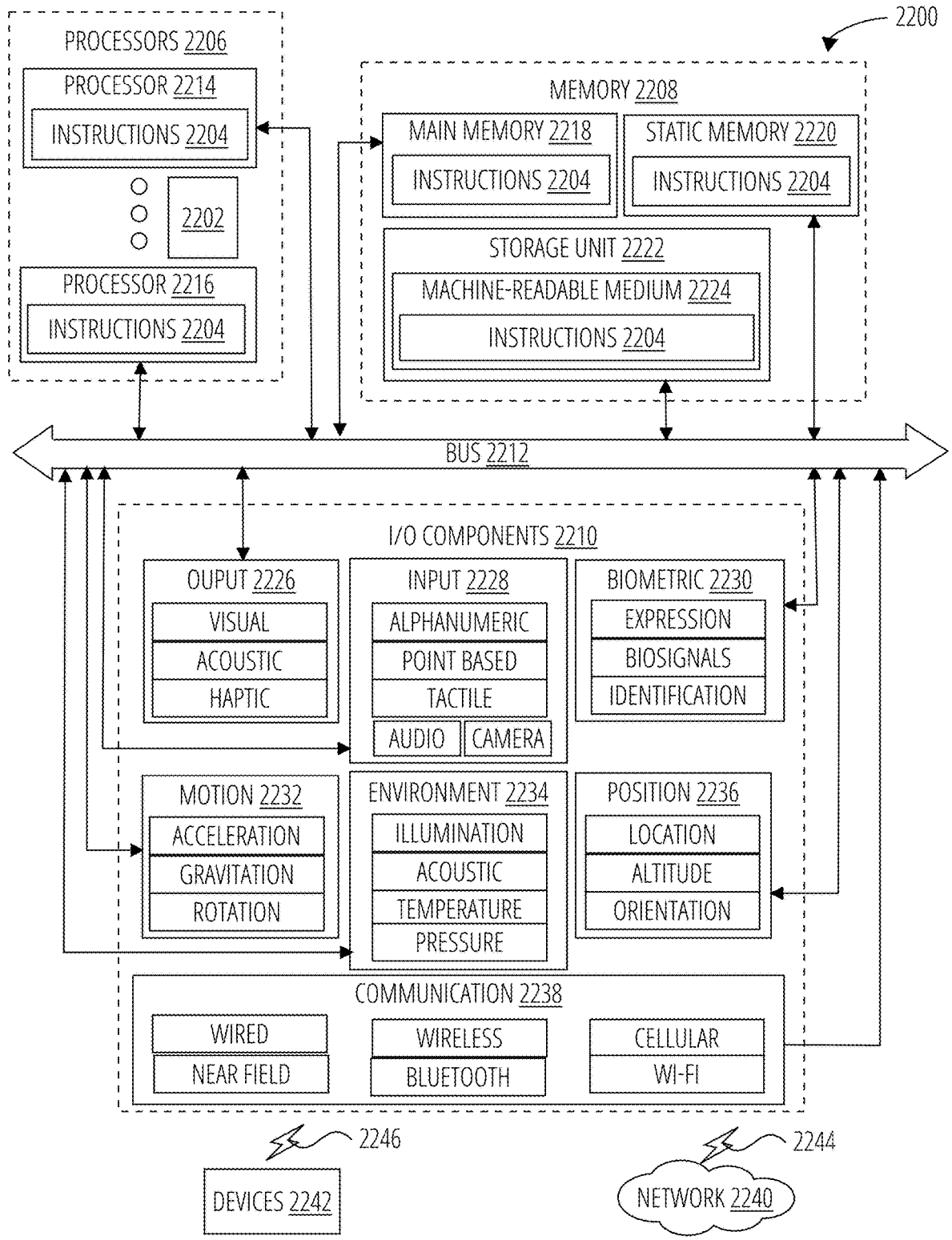
FIG. 22 depict a computer system 2200 in accordance with one embodiment.

FIG. 22 depicts a diagrammatic representation of a computer system 2200 in the form of a computer system comprising one or more bit generating cell array 2202.

Specifically, FIG. 22 depicts a computer system 2200 comprising instructions 2204 (e.g., a program, an application, an applet, an app, or other executable code) for causing the computer system 2200 to perform any one or more of the functions or methods discussed herein. The instructions 2204 configure a general, non-programmed machine into a particular computer system 2200 programmed to carry out said functions and/or methods. The bit generating cell array 2202 may be applied, for example, to generate a key to authenticate or authorize applications, apps, or other executable code to operate on the computer system 2200.

In alternative embodiments, the computer system 2200 operates as a standalone device or may be coupled (e.g., networked) to other machines. In a networked deployment, the computer system 2200 may operate in the capacity of a server machine or a client machine in a server-client network environment, or as a peer machine in a peer-to-peer (or distributed) network environment. The bit generating cell array 2202 may be applied, for example, to generate a key for communication by the computer system 2200 over a network.

The computer system 2200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2204, sequentially or otherwise, that specify actions to be taken by the computer system 2200. Further, while only a single computer system 2200 is depicted, the term "machine" shall also be taken to include a collection of machines that individually or jointly execute the instructions 2204 to perform any one or more of the methodologies or subsets thereof discussed herein.

The computer system 2200 may include processors 2206, memory 2208, and I/O components 2210, which may be configured to communicate with each other such as via one or more bus 2212. In an example embodiment, the processors 2206 (e.g., a Central Processing Unit (CPU), a Reduced Instruction Set Computing (RISC) processor, a Graphics Processing Unit (GPU), a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 2214 and processor 2216) to execute the instructions 2204. The term "processor" is intended to include multi-core processors that may comprise two or more independent processors (sometimes referred to as "cores") that may execute instructions contemporaneously. Although FIG. 22 depicts multiple processors 2206, the computer system 2200 may include a single processor with a single core, a single processor with multiple cores (e.g., a multi-core processor), multiple processors with a single core, multiple processors with multiples cores, or any combination thereof.

Although the bit generating cell array 2202 is depicted as being part of one or more of the processors 2206, in general it may be utilized in any component, such as a motherboard or in one of the I/O components 2210.

The memory 2208 may include one or more of a main memory 2218, a static memory 2220, and a storage unit 2222, each accessible to the processors 2206 such as via the bus 2212. The main memory 2218, the static memory 2220, and storage unit 2222 may be utilized, individually or in combination, to store the instructions 2204 embodying any one or more of the functionality described herein. The instructions 2204 may reside, completely or partially, within the main memory 2218, within the static memory 2220, within a machine-readable medium 2224 within the storage unit 2222, within at least one of the processors 2206 (e.g., within the processor's cache memory), or any suitable combination thereof, during execution thereof by the computer system 2200.

The I/O components 2210 may include a wide variety of components to receive input, provide output, produce output, transmit information, exchange information, capture measurements, and so on. The specific I/O components 2210 that are included in a particular machine will depend on the type of machine. For example, portable machines such as mobile phones will likely include a touch input device or other such input mechanisms, while a headless server machine will likely not include such a touch input device. It will be appreciated that the I/O components 2210 may include many other components that are not shown in FIG. 22. The I/O components 2210 are grouped according to functionality merely for simplifying the following discussion and the grouping is in no way limiting. In various example embodiments, the I/O components 2210 may include output components 2226 and input components 2228. The output components 2226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 2210 may include biometric components 2230, motion components 2232, environmental components 2234, or position components 2236, among a wide array of possibilities. For example, the biometric components 2230 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2232 may include acceleration sensor components (e.g., accelerometer), gravitation sensor components, rotation sensor components (e.g., gyroscope), and so forth. The environmental components 2234 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2236 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2210 may include communication components 2238 operable to couple the computer system 2200 to a network 2240 or devices 2242 via a coupling 2244 and a coupling 2246, respectively. For example, the communication components 2238 may include a network interface component or another suitable device to interface with the network 2240. In further examples, the communication components 2238 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 2242 may be another machine or any of a wide variety of peripheral devices (e.g., a peripheral device coupled via a USB).

Moreover, the communication components 2238 may detect identifiers or include components operable to detect identifiers. For example, the communication components 2238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2238, such as location via Internet Protocol (IP) geolocation, location via Wi-Fi® signal triangulation, location via detecting an NFC beacon signal that may indicate a particular location, and so forth.

The various memories (i.e., memory 2208, main memory 2218, static memory 2220, and/or memory of the processors 2206) and/or storage unit 2222 may store one or more sets of instructions and data structures (e.g., software) embodying or utilized by any one or more of the methodologies or functions described herein. These instructions (e.g., the instructions 2204), when executed by processors 2206, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 2240 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2240 or a portion of the network 2240 may include a wireless or cellular network, and the coupling 2244 may be a Code Division Multiple Access (CDMA) connection, a Global System for Mobile communications (GSM) connection, or another type of cellular or wireless coupling. In this example, the coupling 2244 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2204 and/or data generated by or received and processed by the instructions 2204 may be transmitted or received over the network 2240 using a transmission medium via a network interface device (e.g., a network interface component included in the communication components 2238) and utilizing any one of a number of well-known transfer protocols (e.g., hypertext transfer protocol (HTTP)). Similarly, the instructions 2204 may be transmitted or received using a transmission medium via the coupling 2246 (e.g., a peer-to-peer coupling) to the devices 2242. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2204 for execution by the computer system 2200, and/or data generated by execution of the instructions 2204, and/or data to be operated on during execution of the instructions 2204, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS 100 bit generating cell
102 input stage
104 output stage
106 PFET unit
108 NFET unit
200 bit generating cell
202 NAND gates
204 first loop
206 second loop
208 inverters
210 inverters
300 unclonable bit pattern generator
302 bit generating cell array
304 error correction logic
400 tunable current mirror cell
402 adjustable current mirror
404 adjustable current mirror
406 bit generating cell
408 fixed current mirror
410 fixed current mirror
412 PFET unit
414 NFET unit
600 tunable current mirror cell
700 tunable current mirror cell
702 adjustable current mirror
704 adjustable current mirror
706 current source
708 bit generating cell
900 tunable edge chasing cell
902 inverters
904 inverters
906 adjustable current source
908 fixed current source
1102 block
1104 block
1106 block
1108 block
1110 block
1112 block
1302 aging and enrollment logic
1502 block
1504 block
1506 block
1508 block
1702 inverter
1704 node
1902 aging and enrollment logic 2002 unclonable cell array
2004 computing system
2006 vehicle
2008 robot
2100 computing environment
2102 network
2104 mobile programmable device
2106 operating system
2108 app
2110 app
2112 unclonable bit array
2114 computer
2116 operating system
2118 application
2120 application
2122 unclonable bit array
2124 server
2126 operating system
2128 service
2130 service
2132 unclonable bit array
2134 interpreter
2136 driver
2138 driver
2140 driver
2142 driver
2144 file
2146 file
2148 plug-in
2200 computer system
2202 bit generating cell array
2204 instructions
2206 processors
2208 memory
2210 I/O components
2212 bus
2214 processor
2216 processor
2218 main memory
2220 static memory
2222 storage unit
2224 machine-readable medium
2226 output components
2228 input components
2230 biometric components
2232 motion components
2234 environmental components
2236 position components
2238 communication components
2240 network
2242 devices
2244 coupling
2246 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method of operating a circuit, the method comprising:
   reading output values of a bit pattern generating circuit comprising physically unclonable function (PUF) cells under an a first condition and under a second condition;
   wherein the first condition is one of a biased condition and an unbiased condition, and the second condition is the other;
   identifying particular PUF cells of the bit pattern generating circuit that flipped the output values between the first condition and the second condition; and
   subjecting at least some of the particular PUF cells to accelerated aging to generate aged cells.

2. The method of claim 1, wherein subjecting at least some of the particular PUF cells to accelerated aging to generate aged cells comprises:
   subjecting only the particular PUF cells to accelerated aging to generate aged cells.

3. The method of claim 1, wherein the bias condition is a setting for a current ratio.

4. The method of claim 1, wherein the bias condition is a setting to alter timing of an edge propagation through an edge chasing oscillator.

5. The method of claim 1, further comprising:
   setting the bias condition on the particular PUF cells during the accelerated aging.

6. The method of claim 1, the accelerated aging comprising subjecting the particular PUF cells to a higher than nominal operating voltage, temperature, or both.

7. The method of claim 1, further comprising:
   enabling outputs of PUF cells of the bit pattern generating circuit in the bit pattern, excepting outputs of the particular PUF cells from the bit pattern.

8. The method of claim 7, further comprising:
   reading output values of the aged cells under the unbiased condition;
   reading output values of the aged cells under the biased condition; and
   identifying particular aged cells that did not flip output values between the biased condition and the unbiased condition; and
   enabling outputs of the particular aged cells in the bit pattern, excepting outputs of the aged cells that flipped output values.

9. The method of claim 1, wherein the PUF cells of the bit pattern generating circuit comprise a plurality of current mirroring cells each generating one bit of the bit pattern.

10. The method of claim 9, wherein at least one of the current mirroring cells comprises a PMOS stage and an NMOS stage, and wherein the biased condition comprises setting a maximum current ratio on the PMOS stage.

11. The method of claim 9, wherein at least one of the current mirroring cells comprises a PMOS stage and an NMOS stage, and wherein the biased condition comprises setting a maximum current ratio on the NMOS stage.

12. The method of claim 9, wherein at least one of the current mirroring cells comprises a PMOS stage and an NMOS stage, and wherein the biased condition comprises setting a maximum current ratio on both of the PMOS stage and the NMOS stage.

13. A circuit comprising:
    a physically unclonable function (PUF) cell;
    logic configured to:
       read an output value of the PUF cell during an unbiased condition;
       read the output value under a biased condition; and
       subject the PUF cell to accelerated aging on condition that the output value flipped between the unbiased condition and the biased condition.

14. The circuit of claim 13, wherein the PUF cell is a current mirroring cell and the bias condition is a setting for a current ratio.

15. The circuit of claim 14, wherein the PUF cell comprises a PMOS stage and an NMOS stage, and wherein the biased condition comprises setting a maximum current ratio on the PMOS stage.

16. The circuit of claim 14, wherein the PUF cell comprises a PMOS stage and an NMOS stage, and wherein the biased condition comprises setting a maximum current ratio on the NMOS stage.

17. The circuit of claim 13, wherein the PUF cell is an edge chasing oscillator and the bias condition is a setting to alter timing of an edge propagation through the edge chasing oscillator.

18. The circuit of claim 13, the logic further configured to set the bias condition on the PUF cell during the accelerated aging.

19. The circuit of claim 13, the accelerated aging comprising subjecting the particular cells to a higher than nominal operating voltage, temperature, or both.

20. The circuit of claim 13, the logic further configured to:
enroll the PUF cell to contribute to a generated bit pattern subsequent to the accelerated aging.

21. The circuit of claim 20, the logic further configured to:
read the output value of the PUF cell subsequent to the accelerated aging under the unbiased condition;
read the output value subsequent to the accelerated aging under the biased condition; and
enroll the PUF cell to contribute to the generated bit pattern on condition that the output value did not flip between the unbiased condition and the biased condition subsequent to the accelerated aging.

* * * * *